US007848054B2

(12) United States Patent
Hsiao et al.

(10) Patent No.: US 7,848,054 B2
(45) Date of Patent: Dec. 7, 2010

(54) PERPENDICULAR MAGNETIC WRITE HEAD HAVING A CORNER NOTCHED CONFORMAL, WRAP-AROUND, TRAILING MAGNETIC SHIELD FOR REDUCED ADJACENT TRACK INTERFERENCE

(75) Inventors: Wen-Chien David Hsiao, San Jose, CA (US); Yimin Hsu, Sunnyvale, CA (US); Vladimir Nikitin, Campbell, CA (US); Aron Pentek, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 849 days.

(21) Appl. No.: 11/744,054

(22) Filed: May 3, 2007

(65) Prior Publication Data
US 2007/0211384 A1 Sep. 13, 2007

Related U.S. Application Data

(63) Continuation-in-part of application No. 11/286,077, filed on Nov. 23, 2005.

(51) Int. Cl.
*G11B 5/127* (2006.01)
(52) U.S. Cl. .................................. 360/125.09
(58) Field of Classification Search ............ 360/125.09, 360/125.3
See application file for complete search history.

(56) References Cited

U.S. PATENT DOCUMENTS

| | | | |
|---|---|---|---|
| 6,950,277 B1 | 9/2005 | Nguy et al. ............... 360/119 |
| 7,227,720 B2 * | 6/2007 | Sasaki et al. .......... 360/125.12 |
| 7,443,633 B2 * | 10/2008 | Tagami et al. ............ 360/125.5 |
| 7,552,523 B1 * | 6/2009 | He et al. .................. 29/603.16 |
| 7,649,712 B2 * | 1/2010 | Le et al. .................. 360/125.3 |
| 7,663,839 B2 * | 2/2010 | Sasaki et al. .......... 360/125.03 |
| 2003/0039064 A1 | 2/2003 | Khizroev et al. ........... 360/126 |
| 2005/0024779 A1 * | 2/2005 | Le et al. .................... 360/317 |
| 2005/0243463 A1 | 11/2005 | Fontana, Jr. et al. |
| 2005/0280935 A1 | 12/2005 | Clinton et al. .............. 360/125 |
| 2006/0044681 A1 | 3/2006 | Le et al. .................... 360/126 |
| 2006/0044682 A1 | 3/2006 | Le et al. .................... 360/126 |
| 2006/0103982 A1 | 5/2006 | Nakamoto et al. ......... 360/126 |
| 2006/0139802 A1 * | 6/2006 | Sasaki et al. ............... 360/126 |
| 2006/0174474 A1 | 8/2006 | Le .......................... 29/603.12 |
| 2006/0203381 A1 | 9/2006 | Okada et al. ............... 360/125 |
| 2006/0256472 A1 | 11/2006 | Hirabayashi et al. ....... 360/126 |
| 2007/0258167 A1 * | 11/2007 | Allen et al. ................ 360/126 |

* cited by examiner

*Primary Examiner*—David D Davis
(74) *Attorney, Agent, or Firm*—Zilka-Kotab, PC

(57) ABSTRACT

A perpendicular magnetic write head having a conformal wrap around trailing shield. The write head includes a write pole that can be configured with a trapezoidal shape as viewed from the Air Bearing Surface (ABS) and which includes a wrap around trailing magnetic shield. The magnetic shield has a trailing portion that is separated from the leading edge of the write pole by a non-magnetic trailing gap, and has side shield portions that are separated from first and second side portions of the write pole by first and second non-magnetic side gaps. The magnetic shield can be configured with notches at either side of the trailing portion of magnetic shield. These notches can extend in the trailing direction by a distance that is preferably ¼ to 1 times the trailing gap thickness. The width of the straight, trailing portion of the shield is preferable ½ to 1 times of the main pole width.

21 Claims, 39 Drawing Sheets

PERPENDICULAR MAGNETIC WRITE HEAD HAVING A CORNER NOTCHED CONFORMAL, WRAP-AROUND, TRAILING MAGNETIC SHIELD FOR REDUCED ADJACENT TRACK INTERFERENCE

RELATED APPLICATIONS

This application is a Continuation In Part of commonly assigned U.S. patent application Ser. No. 11/286,077, filed on Nov. 23, 2005 and entitled Write Head Design and Method for Reducing Adjacent Track Interference at Very Narrow Track Widths, which is incorporated herein by reference.

FIELD OF THE INVENTION

The present invention relates to perpendicular magnetic recording and more particularly to a novel trailing magnetic shield design and a method for manufacturing such a shield design.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to be antiparallel coupled to the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (API) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetization oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One of the features of perpendicular recording systems is that the high coercivity top layer of the magnetic medium has a high switching field. This means that a strong magnetic field is needed to switch the magnetic moment of the medium when writing a magnetic bit of data. In order to decrease the switching field and increase recording speed, attempts have been made to angle or "cant" the write field being emitted from the write pole. Canting the write field at an angle relative to the normal of the medium makes the magnetic moment of the medium easier to switch by reducing the switching field. Modeling has shown that a single pole writer in a perpendicular recording system can exhibit improved transition sharpness (ie. better field gradient and resolution), achieve better media signal to noise ratio, and permit higher coercive field media for higher areal density magnetic recording if, according to the Stoner-Wohlfarth model for a single particle, the effective flux field is angled. A method that has been investigated to cant the magnetic field has been to provide a trailing magnetic shield adjacent to the write head, to magnetically attract the field from the write pole.

The trailing shield can be a floating design, in that the magnetic trailing shield is not directly, magnetically connected with the other structures of the write head. Magnetic field from the write pole results in a flux in the shield that essentially travels through the magnetic medium back to the return pole of the write head. Various dimensions of the shield are critical for the floating trailing shield to operate correctly. For instance, effective angling or canting of the effective flux field is optimized when the write pole to trailing shield separation (gap) is about equal to the head to soft underlayer spacing (HUS) and the trailing shield throat height is roughly equal to half the track-width of the write pole. This design improves write field gradient at the expense of effective flux field. To minimize effective flux field lost to the trailing shield and still achieve the desired effect, the gap and shield thickness are adjusted to minimize saturation at the shield and effective flux field lost to the shield respectively. In order for a trailing shield to function optimally, the thickness of the trailing shield gap must be tightly controlled. Therefore, there is a need for a means for accurately controlling such trailing gap thickness during manufacture.

A problem that arises as a result of shrinking trackwidth designs, whether they be longitudinal recording systems or perpendicular recording systems, is that the tracks are so close to one another that the signal from a write head can inadvertently write to an adjacent track. This has been referred to as adjacent track interference, and becomes more of a problem as designers attempt to fit more tracks of data into a given area of disk space.

Therefore, there is a need for a method or design that can produce a write head that will not cause adjacent track interference, even at extremely high track densities. Such a design or method must be manufacturable, allowing in large batch manufacturing processes, without incurring significant additional manufacturing expense or complexity.

SUMMARY OF THE INVENTION

The present invention provides a magnetic write head for perpendicular magnetic data recording. The write head includes a write pole and a conformal, trailing wrap-around, magnetic shield. The magnetic shield has a trailing portion and has first and second side portions. The side portions are separated from first and second sides of the write pole by non-magnetic side gaps, and have inner edges that conform to the sides of the write pole. That is, the inner edges of the side portions of the magnetic shield are substantially parallel with an adjacent side of the write pole.

The magnetic shield can be configured with notches at either side of the trailing portion of the magnetic shield. These notches can, therefore, be located at the juncture of the sides and trailing portion of the magnetic shield. These notches, which advantageously improve magnetic performance of the write head, can be formed to extend in the trailing direction by a distance that is ¼ time the trailing gap thickness.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
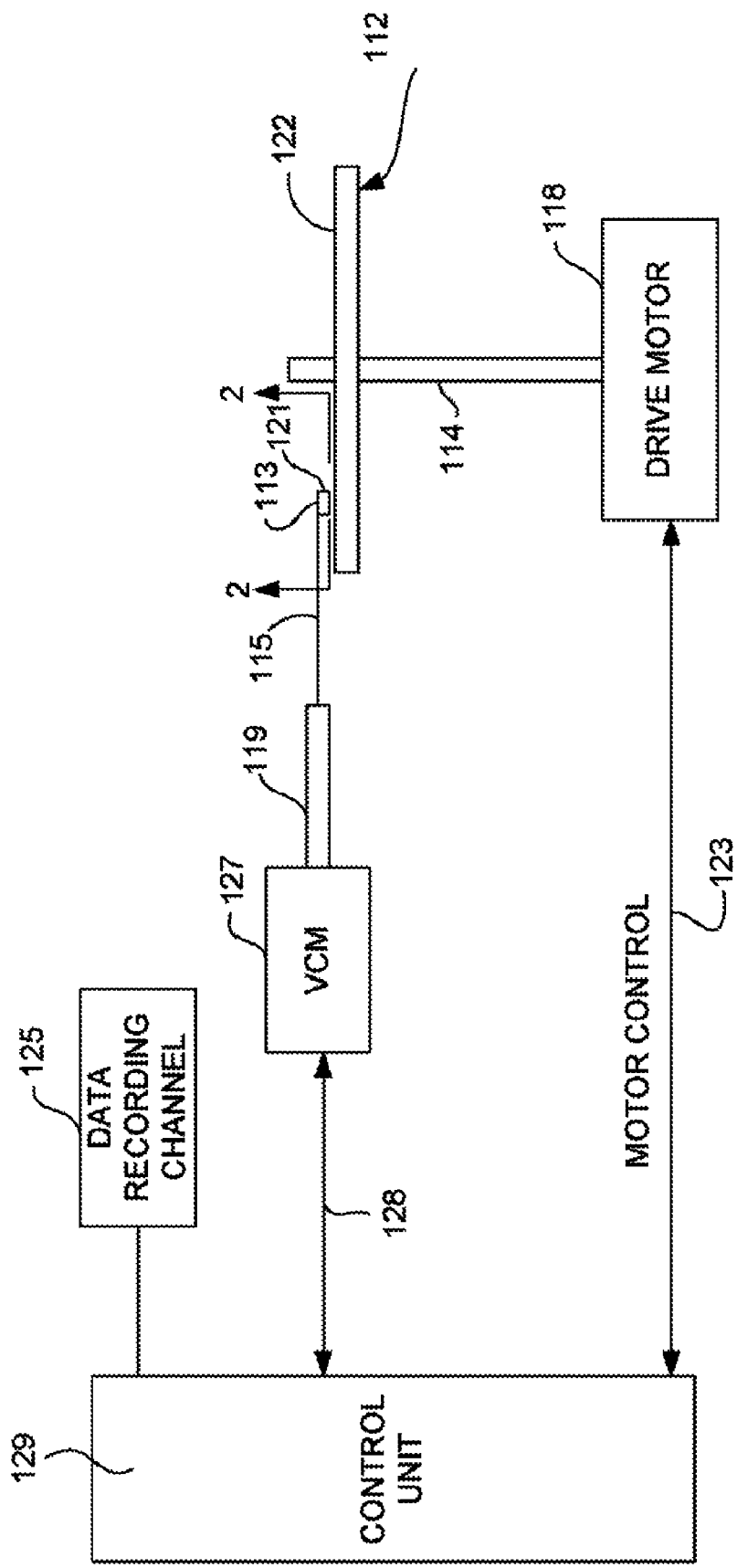
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 221. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
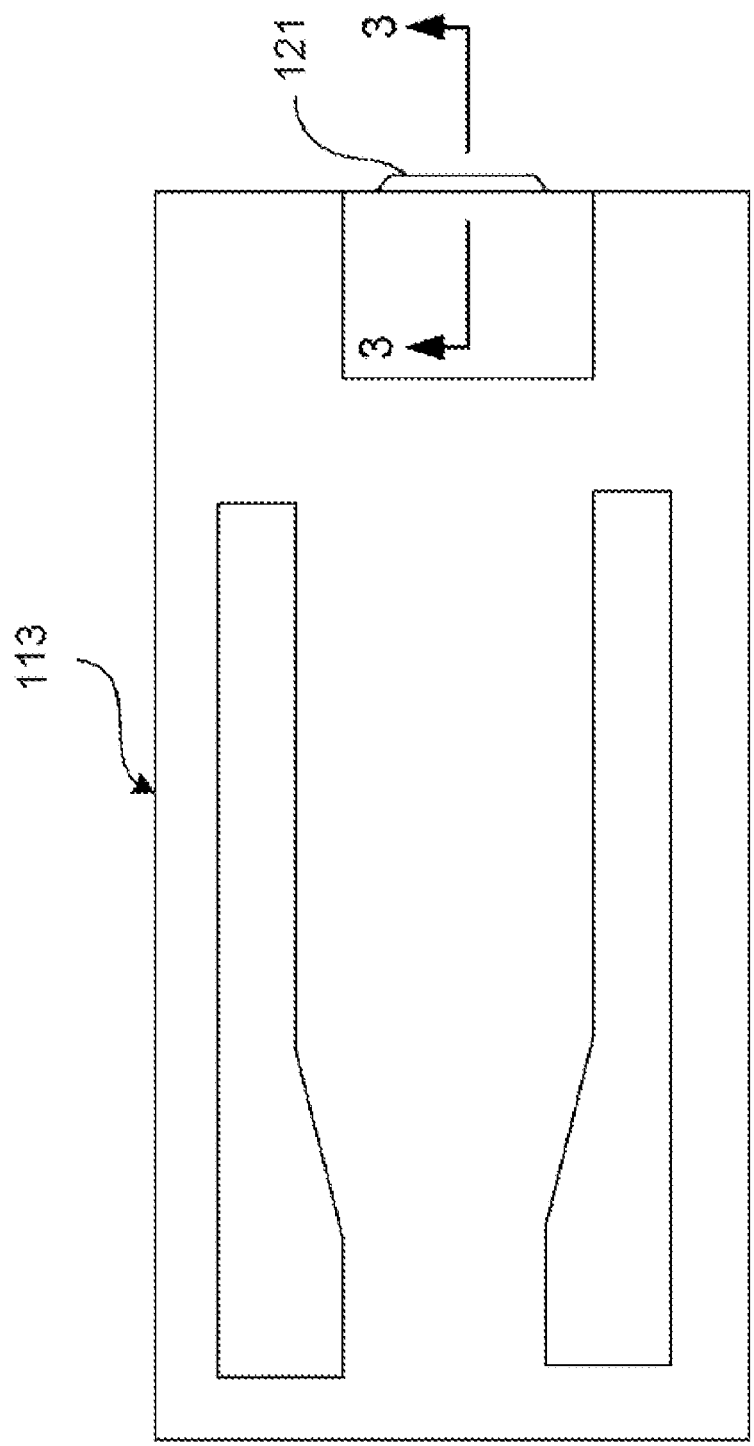
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
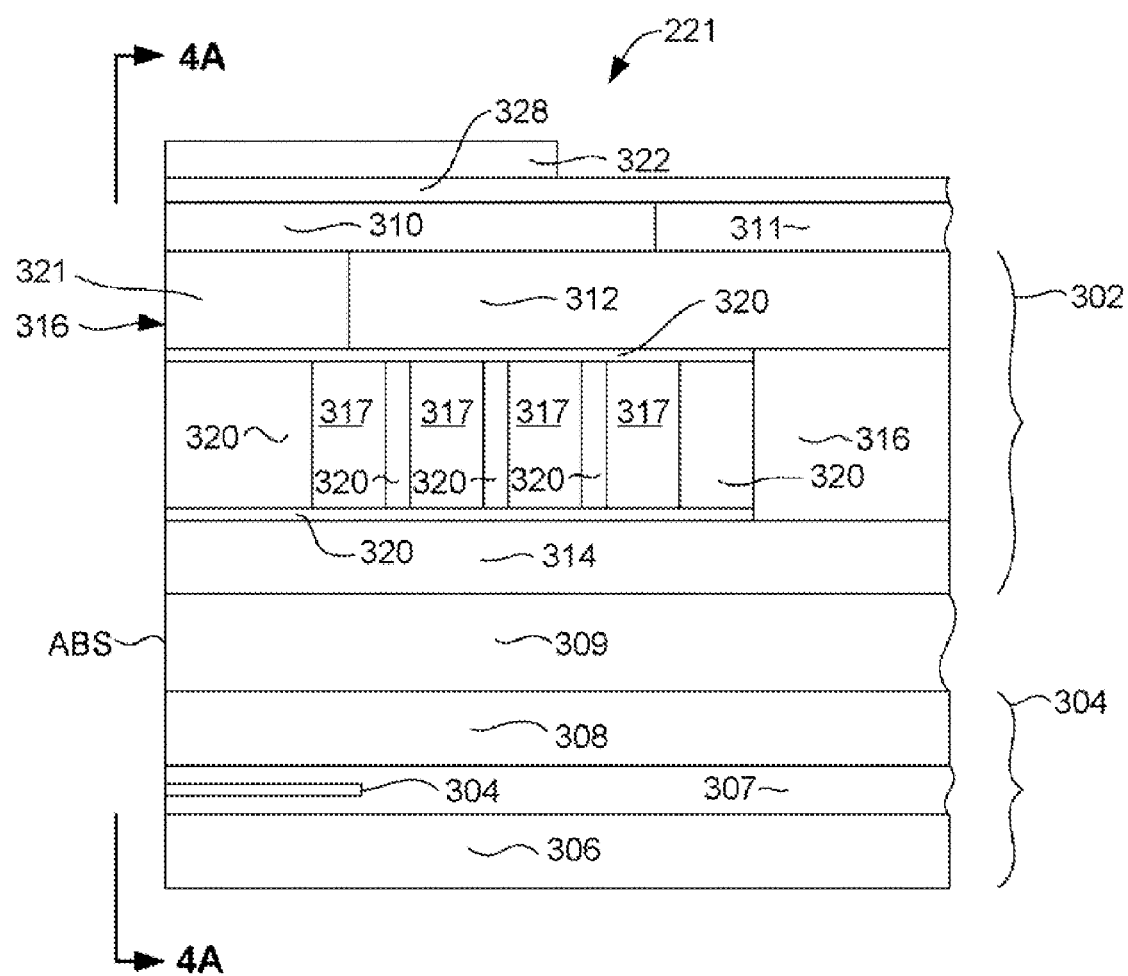
FIG. 3 is a cross sectional view, taken from line 3-3 of FIG. 2 and rotated 90 degrees counterclockwise, of a magnetic head according to an embodiment of the present invention.

With reference now to FIG. 3, the magnetic head 221 for use in a perpendicular magnetic recording system is described. The head 221 includes a write element 302 and a read sensor 304. The read sensor is preferably a giant magnetoresistive (GMR) sensor and is preferably a current perpendicular to plane (CPP) GMR sensor. CPP GMR sensors are particularly well suited for use in perpendicular recording systems. However, the sensor 304 could be another type of sensor such as a current in plane (CIP) GMR sensor or, a tunnel junction sensor (TMR) or some other type of sensor. The sensor 304 is located between and insulated from first and second magnetic shields 306, 308 and embedded in a dielectric material 307. The magnetic shields, which can be constructed of for example CoFe or NiFe, absorb magnetic fields, such as those from uptrack or down track data signals, ensuring that the read sensor 304 only detects the desired data track located between the shields 306, 308. A non-magnetic, electrically insulating gap layer 309 may be provided between the shield 308 and the write head 302.

With continued reference to FIG. 3, the write element 302 includes a write pole 310 that is magnetically connected with a magnetic shaping layer 312, and is embedded within an insulation material 311. The write pole has a small cross section at the air bearing surface and is constructed of a material having a high saturation moment, such as NiFe or CoFe. The shaping layer 312 is constructed of a magnetic material such as CoFe or NiFe and has a cross section parallel to the ABS surface that is significantly larger than that of the write pole 310.

The write element 302 also has a return pole 314 that preferably has a surface exposed at the ABS and has a cross section parallel with the ABS surface that is much larger than that of the write pole 310. The return pole 314 is magnetically connected with the shaping layer 312 by a back gap portion 316. The return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by an electrically insulating material 320 that electrically insulates the turns of the coil 317 from one another and electrically isolates the coil 317 from the surrounding magnetic structures 310, 312, 316, 314. When a current passes through the coil 317, the resulting magnetic field causes a magnetic flux to flow through the return pole 314, back gap 316, shaping layer 312 and write pole 310. This magnetic flux causes a write field 321 to be emitted toward an adjacent magnetic medium. The shaping layer 312 is also surrounded by an insulation layer 321 which separates the shaping layer 312 from the ABS. The insulation layers 320, 321, 311 can all be constructed of the same material, such as alumina ($Al_2O_3$) or of different electrically insulating materials.

Figure 4A:
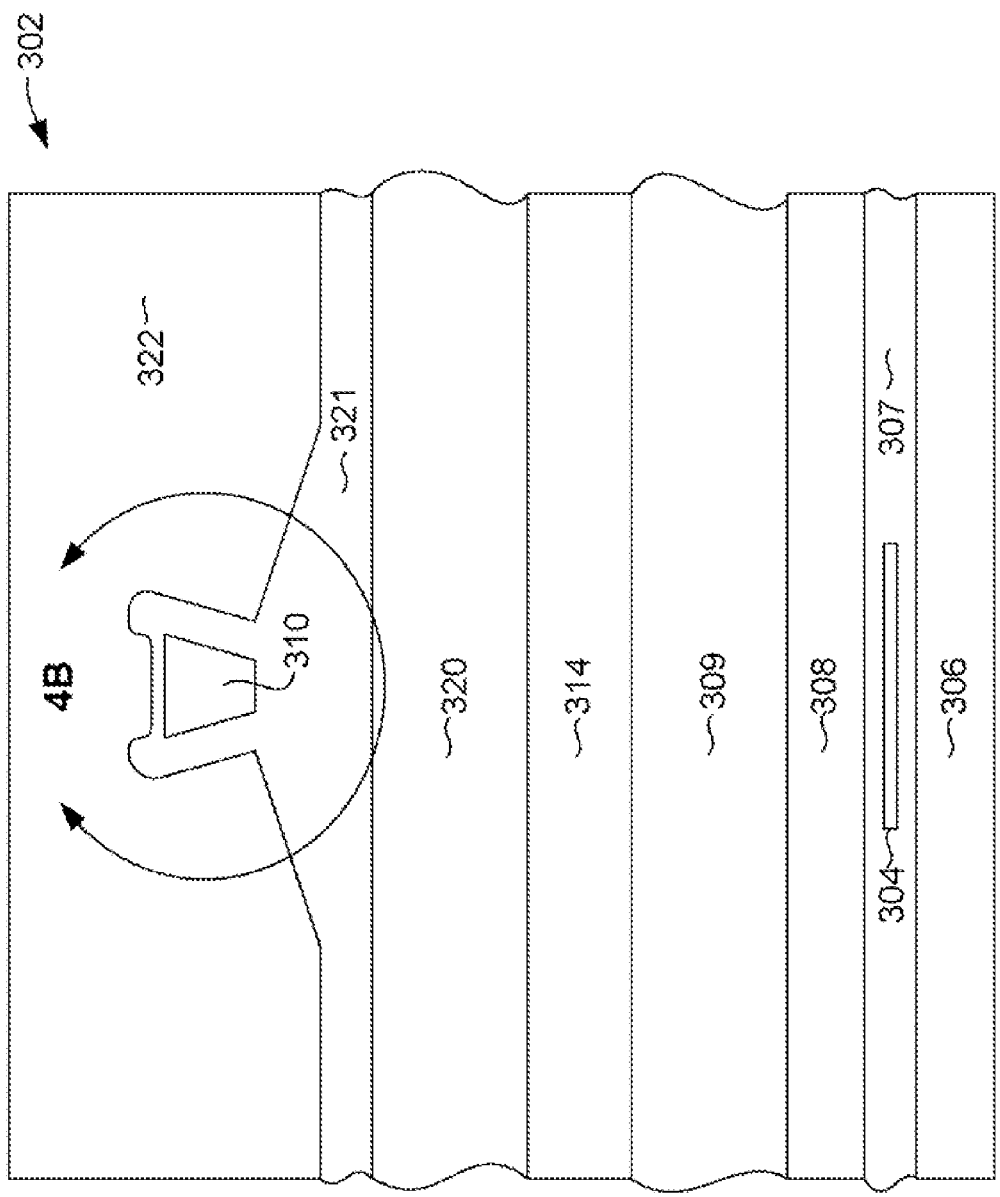
FIG. 4A is an ABS view of the write head taken from line 4-4 of FIG. 3.

The write head element 302 also includes a trailing shield 322. With reference to FIG. 4A, the trailing shield 322 wraps around the write pole 310 to provide side shielding as well as trailing shielding from stray magnetic fields. These stray magnetic fields can be from the portions of the write head 302 itself, or could also be from adjacent track signals or from magnetic fields from external sources.

Figure 4B:
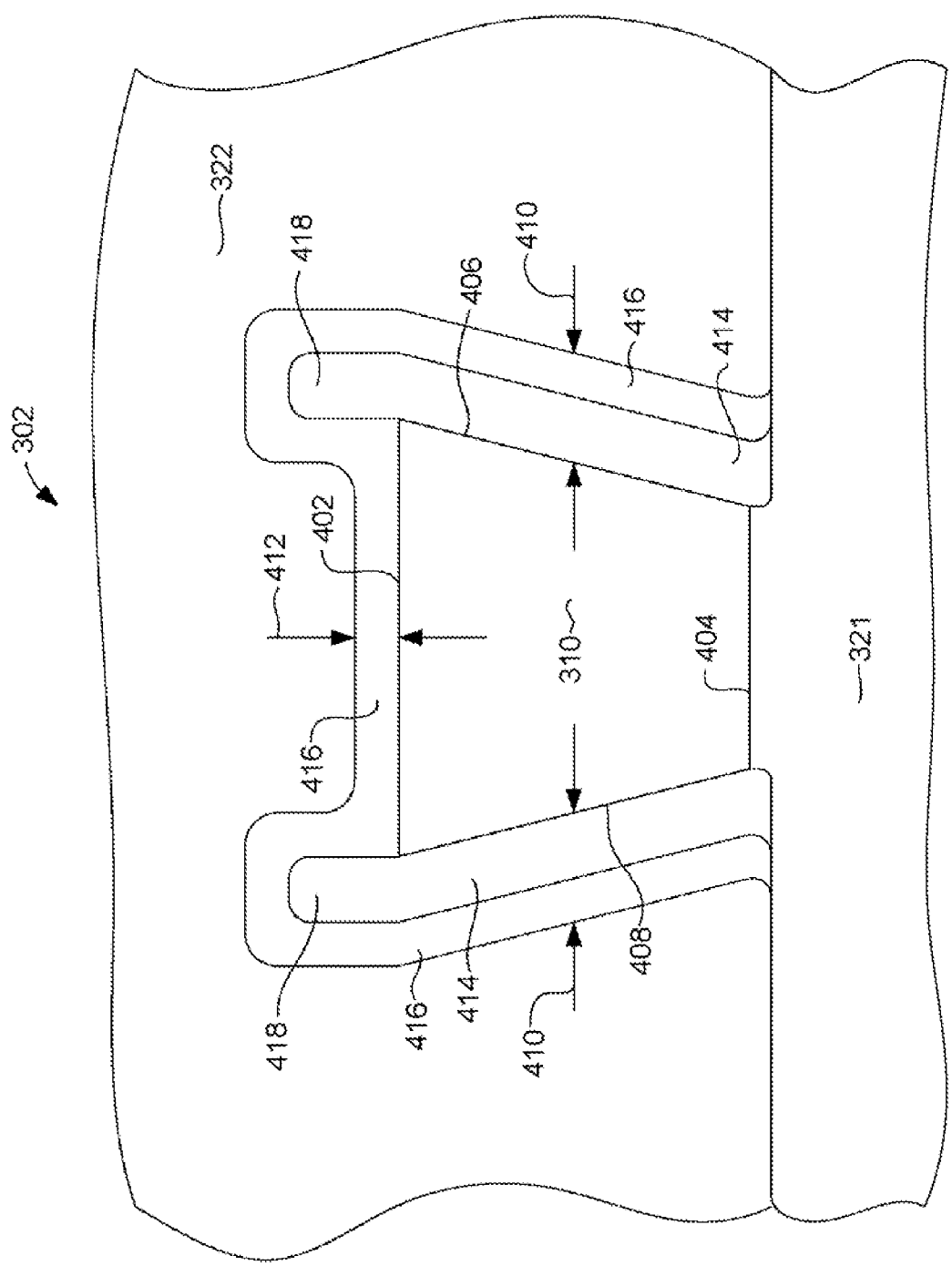
FIG. 4B is an ABS view taken from circle 4B of FIG. 4A.

With reference now to FIG. 4B the configuration of the write pole 310 and the surrounding portions of the trailing shield 322 are shown enlarged and in greater detail. The write pole 310 has a trailing edge 402 and a leading edge 404. The terms trailing and leading are with respect to the direction of travel along a data track during when the write head 302 is in use. The write pole 310 also preferably has first and second laterally opposing sides 406, 408 that are configured to define a width at the leading edge 404 that is narrower than the width at the trailing edge 404, forming a write pole 310 having a trapezoidal shape. This trapezoidal shape is useful in preventing adjacent track writing due to skew of the write head 302 when the head 302 is located at extreme outer or inner positions over the disk, however, this trapezoidal shape of the write head 310 is not necessary to practice the present invention.

With continued reference to FIG. 4B, the magnetic trailing shield 322 is separated from each side 406, 408 of the write pole 310 by a side gap 410. The trailing shield 322 is also separated from the trailing shield, by a trailing gap 412. The thickness of each of the side gaps 410 is preferably about 1.5 to 2.5 or about 2 times the thickness of the trailing gap 412. The materials defining and filling the side and trailing gaps 410, 412 are preferably non-magnetic materials and may be the same materials or may be different materials. Preferably, the side gaps include a first non-magnetic layer 414, which may be for example alumina, and a second non-magnetic layer 416 which may also be alumina or some other material. The second non-magnetic layer 416 also preferably extends over the top of the write pole 310 to define the trailing gap 412.

As can be seen with reference to FIG. 4B, the trailing shield 322 can be configured with notches 418 at either side of the write pole 310. The notches can be described as extensions of the side gaps 410 that extend in the trailing direction slightly beyond the trailing edge gap 412. The notches 418 are an artifact of a process for constructing the trailing shield 322 by a process that will be described below. The trailing shield 322 can be constructed of a magnetic material such as NiFe.

Figure 5:
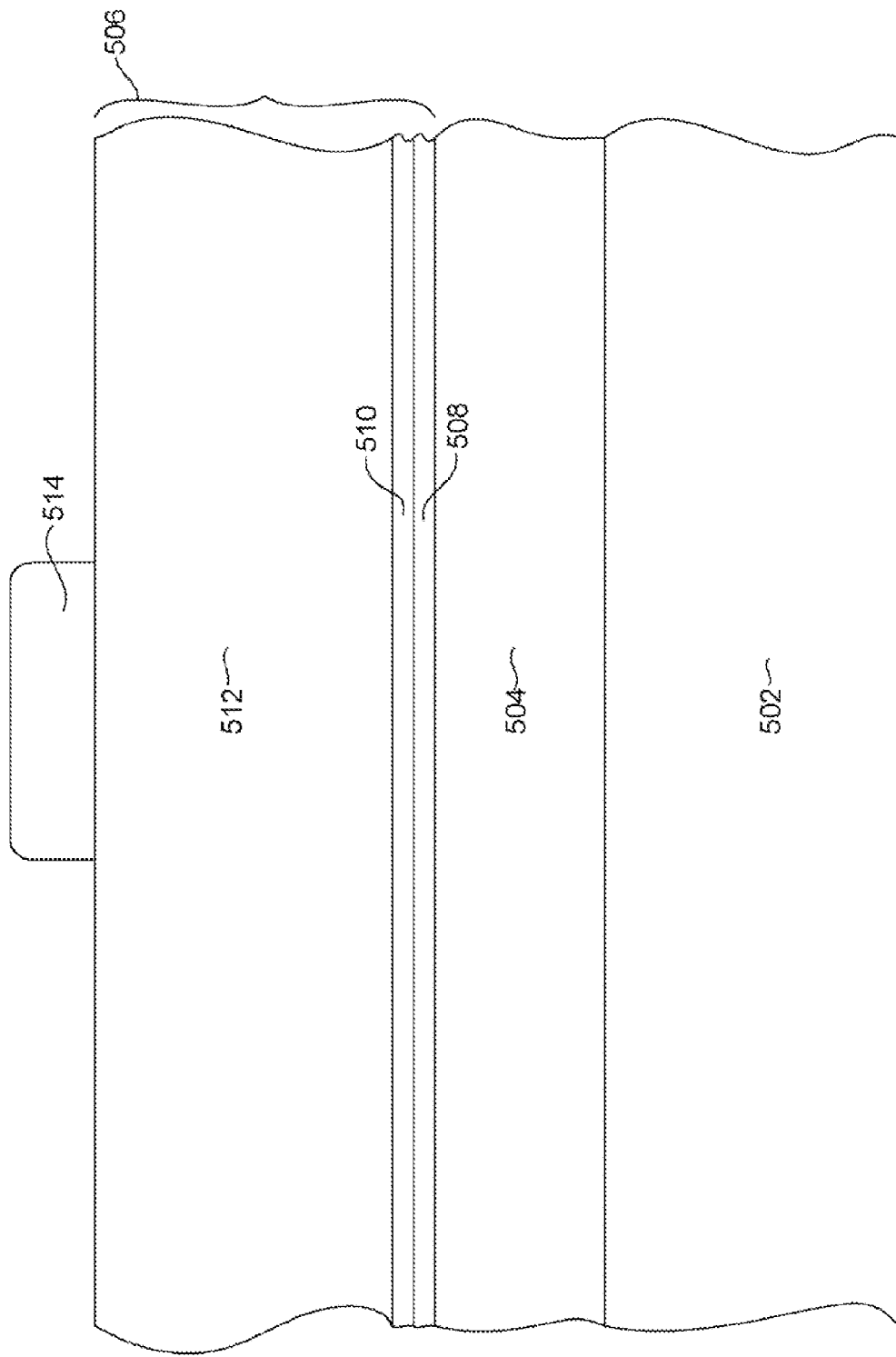
FIGS. 5-13 are ABS views similar to that of FIGS. 4A and 4B, showing a magnetic head in various intermediate stages of manufacture and illustrating a method of manufacturing a magnetic head according to an embodiment of the invention.

With reference now to FIGS. 5 through 13, a method for constructing a write pole and a wrap around trailing shield according to an embodiment is described. With particular reference to FIG. 5, a substrate layer 502 is provided. The substrate 502 can include, for example, the insulation layer 321 and shaping layer 312 described with reference to FIGS. 3 and 4. In that case, the shaping layer 312 can be constructed of, for example NiFe, which has been plated into a photoresist frame. The insulation layer 321 could be constructed by filling with a material such as alumina after the shaping layer has been defined and its photoresist frame has been lifted off. The alumina layer 321 and shaping layer 312 can then be planarized by chemical mechanical polishing to provide a smooth planar surface on which to deposit subsequent layers. The formation of the substrate 502 (shaping layer 312, and insulation 321 from FIGS. 3 and 4) will be familiar to those skilled in the art and is not illustrated in FIG. 5.

With continued reference to FIG. 5, write pole material 504 is deposited over the substrate 502. The write pole material 504 can be a single layer of a suitable high magnetic permeability material such as CoFe, or more preferably can include many laminations of layers of a high permeability, low coercivity materials such as CoFe separated by very thin lamination layers, such as thin layers of alumina. The write pole material 504, whether formed as a single layer or lamination of multiple layers can be deposited by sputter deposition.

With the write pole material 504 deposited. A series of mask layers 506 can be deposited. The mask layers 506 can include a layer of hard mask material 507, which may include a layer of alumina 508 and a layer of diamond like carbon (DLC) 510. The hard mask may include only a single layer, such as a single layer of alumina or a single layer of DLC, but improved critical dimension control of the write pole width can be achieved by using a bi-layer hard mask constructed of both alumina and DLC. The mask layers 506 also include an image transfer layer 512 constructed of a material such as DURIMIDE®, and a photosensitive mask material 514 such as photoresist. The hard mask layers 507, including both the alumina layer 508 and DLC layer 510 can be deposited by sputter deposition. The image transfer layer 512 and photosensitive layer 514 can be deposited (spun onto the wafer).

Figure 6:
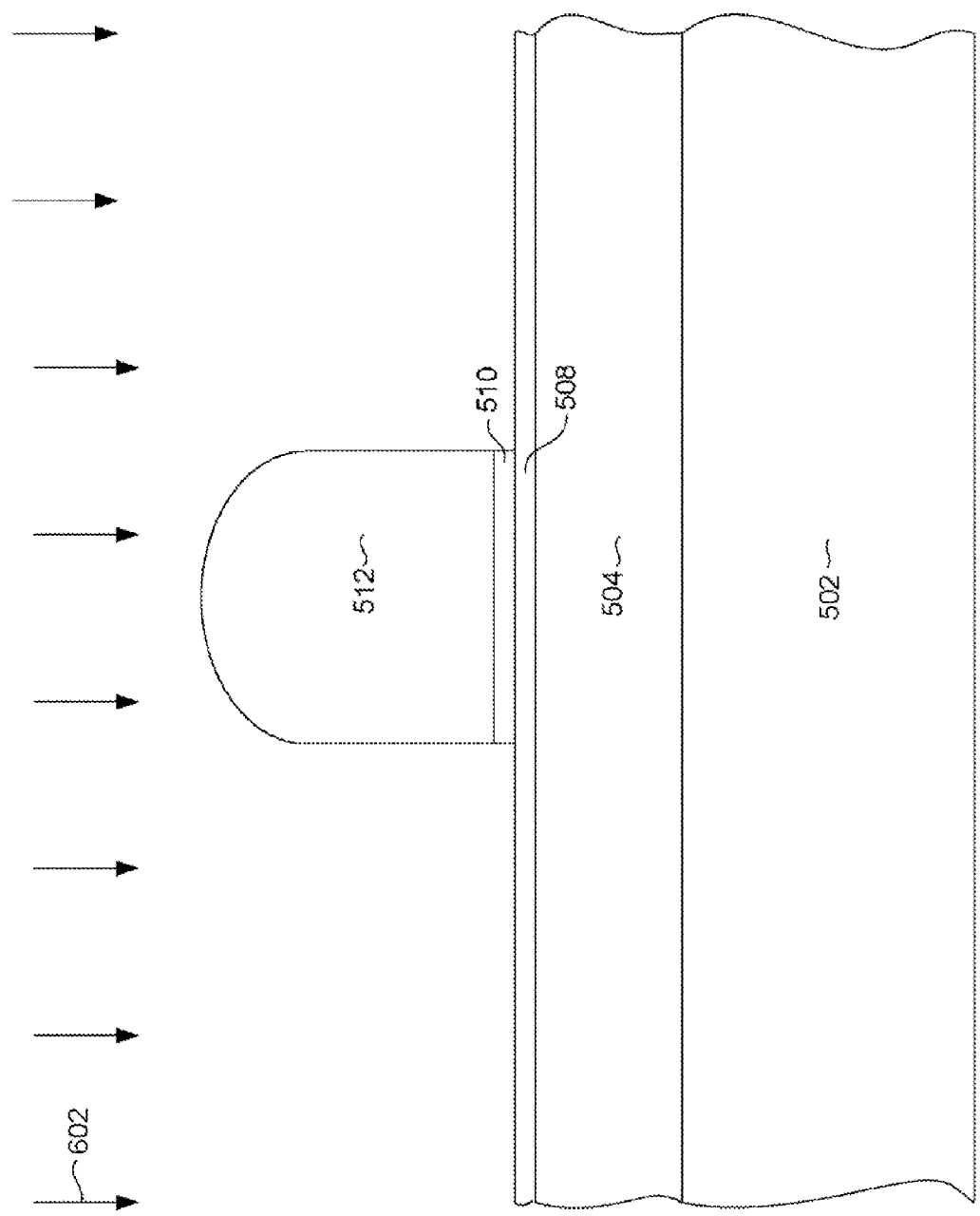

The photoresist mask 514 is photolithographically patterned to form a mask having a desired width for determining a width of the finished write pole 510 (FIGS. 4A, 4B). With reference to FIG. 6, a reactive ion etch (RIE) 602 is performed to transfer the image of the photoresist layer 514 onto the underlying mask layers 510, 512. The photoresist layer 514 may be completely consumed by the RIE so that no photoresist layer 514 actually remains after performing this RIE 602.

The RIE 602 removes portions of the DLC layer 510 and image transfer layer 512 that extended beyond the sides of the photoresist layer 514 as shown in FIG. 5. However, most of the hard mask layer 508 remains after performing the RIE.

Figure 7:
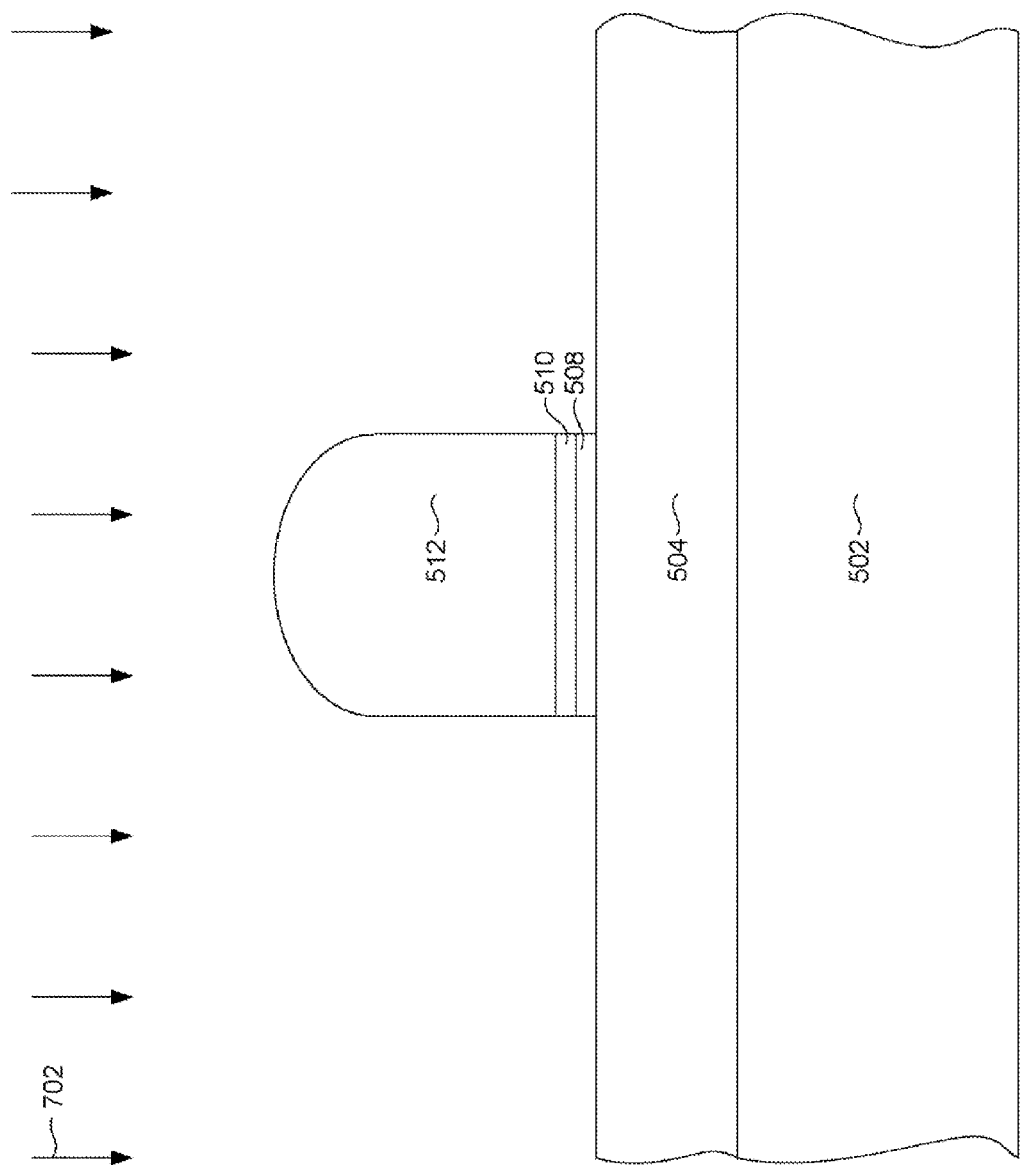
Figure 8:
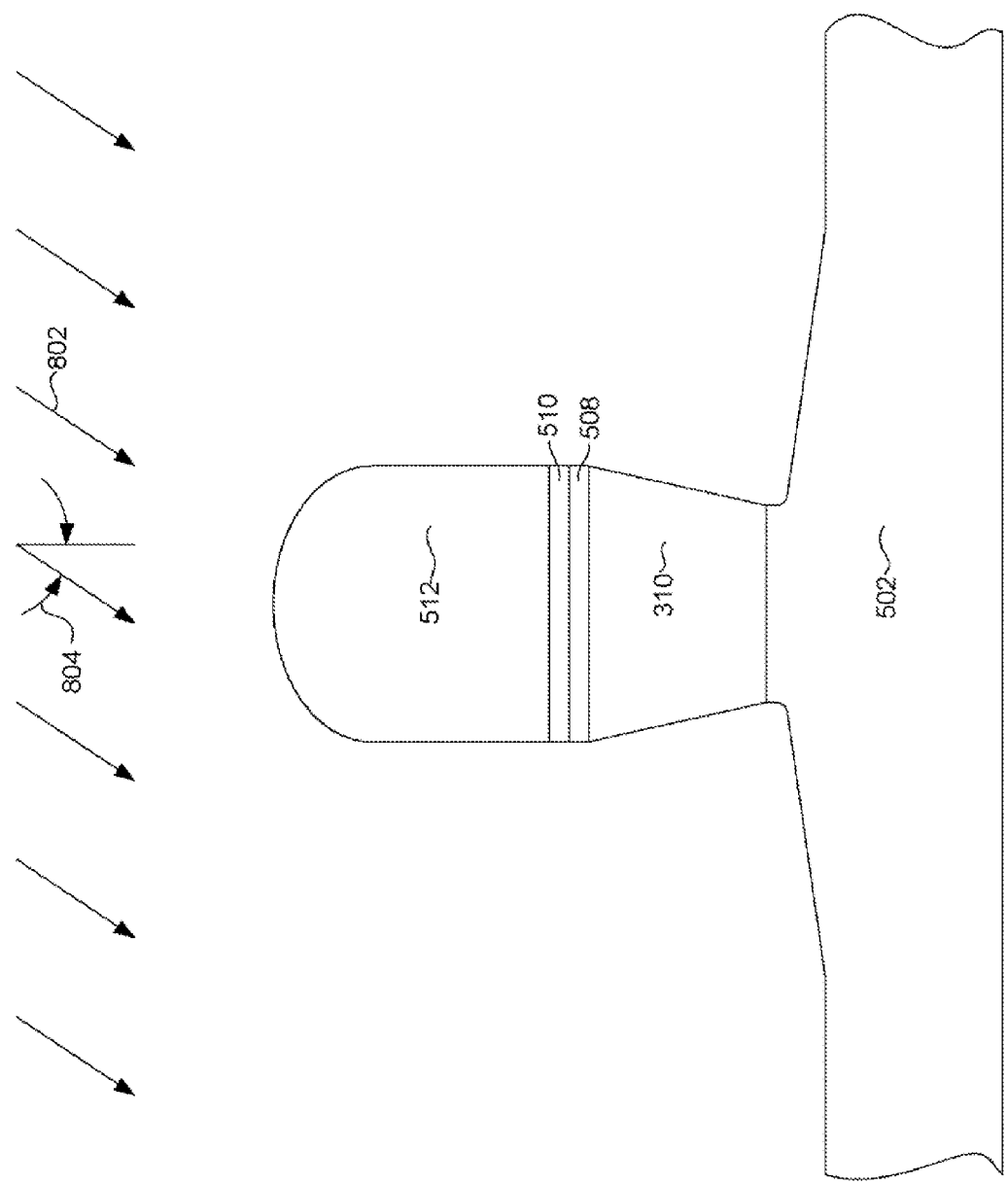

With reference to FIG. 7, a reactive ion milling (RIM) process 702 is performed to remove portions of the hard mask 508 that are not protected by the remaining mask layers 510, 512. Then, with reference to FIG. 8, an ion mill 802 is performed to remove write pole material 504 to form the write pole 510 describe previously with reference to FIGS. 3, 4A and 4B. The ion mill 802 is preferably performed at an angle 804 with respect to a normal to the surfaces of the layers 502-512. This angled ion milling removes write pole material 504 in such a manner as to form angled sides on the write pole 310, resulting in a write pole 310 having the desired trapezoidal shape discussed previously. The ion mill is preferably performed sufficiently to remove write pole material 504 down to a level that is slightly below the level of the bottom of the write pole material 510.

Figure 9:
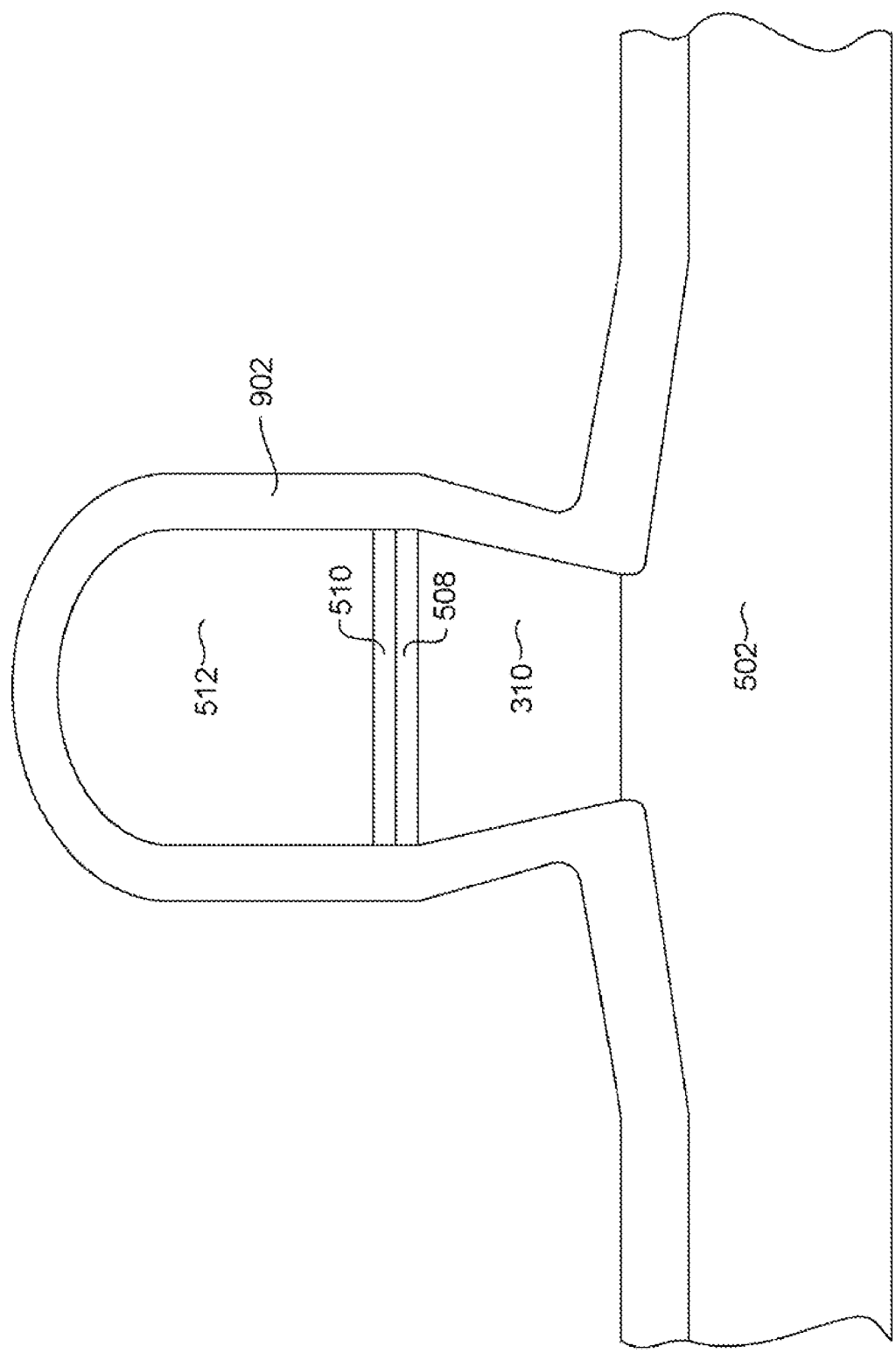

With reference now to FIG. 9, a first non-magnetic layer 902 is deposited. This layer may be alumina or some other non-magnetic material. The first non-magnetic layer 902 is preferably deposited by a conformal deposition technique such as atomic layer deposition (ALD) or some other conformal deposition process. The first non-magnetic layer 902 (first alumina layer) is deposited to such a thickness as is necessary to define a desired side gap between the sides of the write pole and the finished trailing shield. This will become clearer below.

Figure 10:
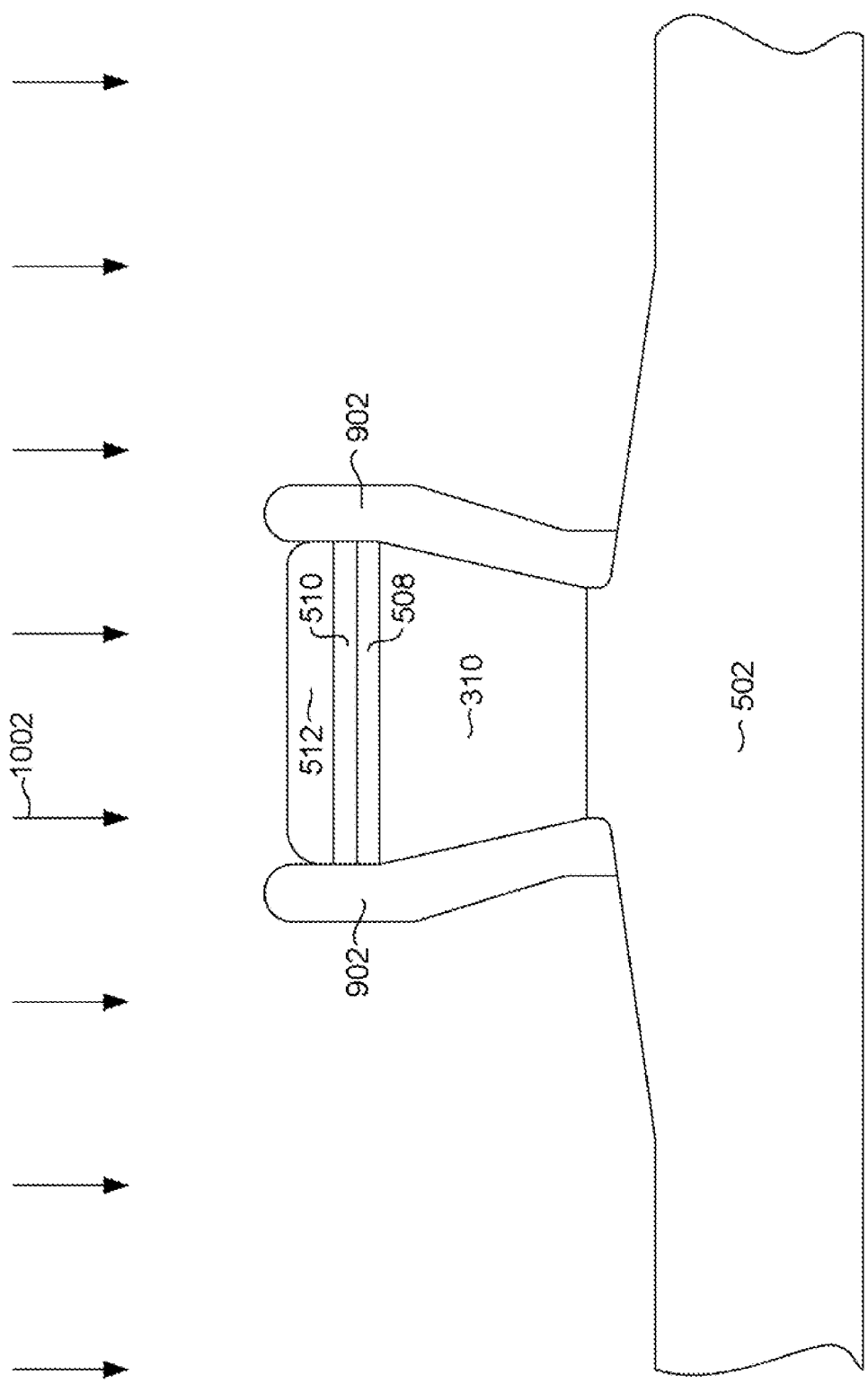

With reference to FIG. 10, a reactive ion milling process RIM 1002 is performed. The RIM process is a directional process that preferentially removes horizontally disposed portions of the first non-magnetic layer 902. The RIM process 1002 is preferably performed sufficiently to remove all of the horizontally disposed portions of the first non-magnetic layer 902, leaving vertical walls 902 remaining at the sides of the write pole. As can be seen the non-magnetic walls 902 extend above the top (trailing edge) of the write pole 310. The RIM process also removes most if not all of the image transfer layer (DURAMIDE® layer). With reference to FIG. 9, it can be seen that the RIM process 1002 opens up the remaining mask structures 512, 510, 508 above the write pole 310.

Figure 11:
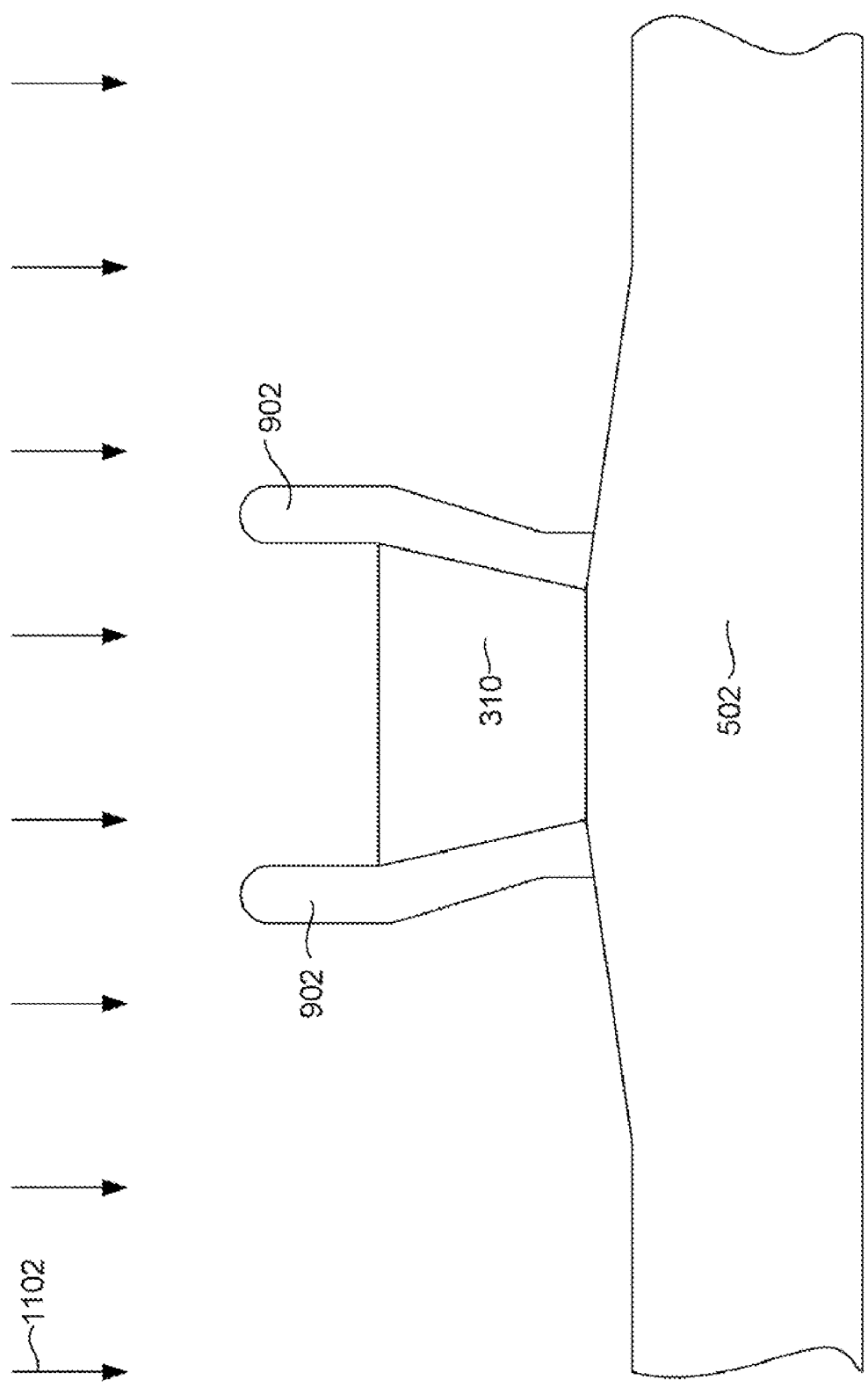
Figure 12:
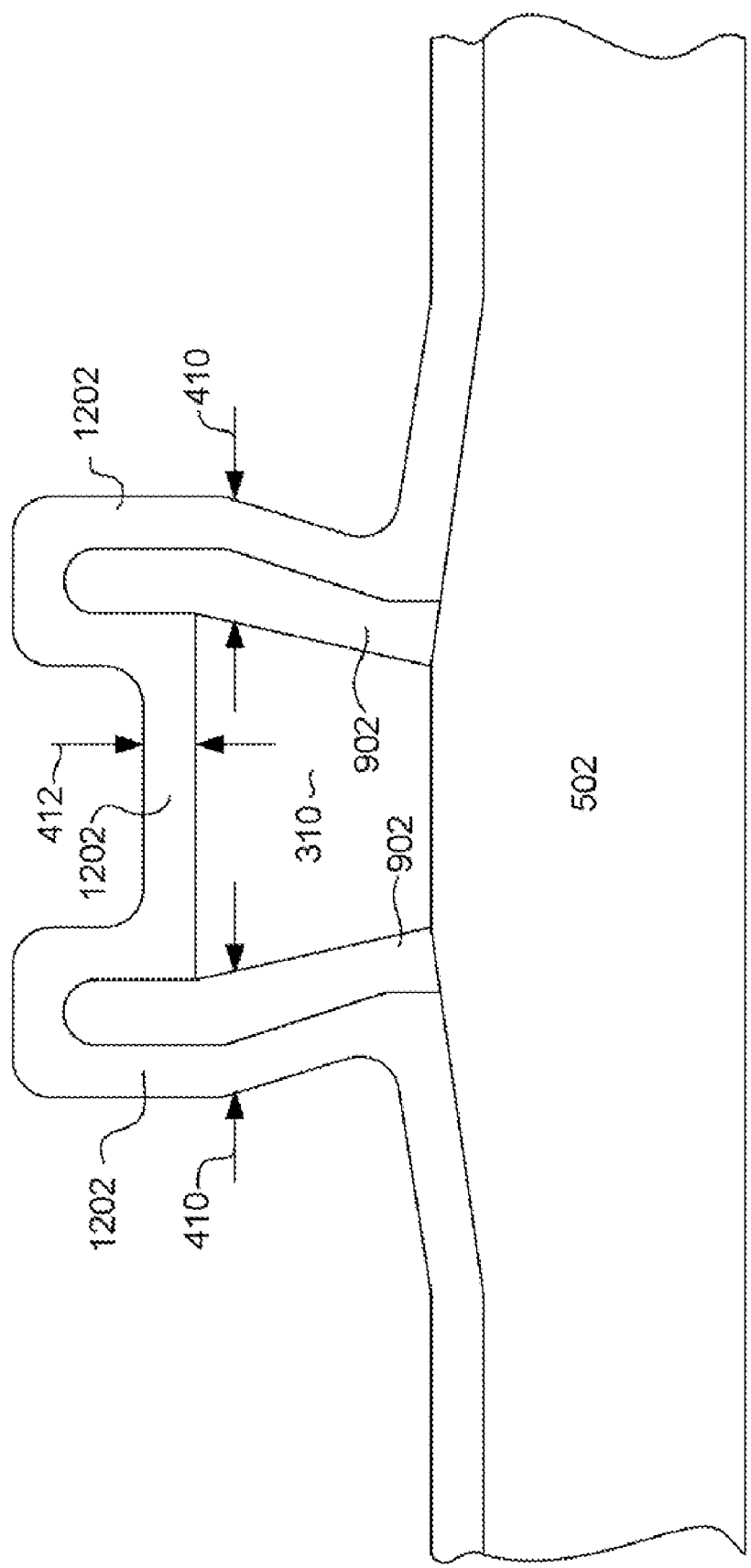

With reference now to FIG. 11, a reactive ion etch 1102 is performed to remove the remaining image transfer layer 512, as well as the DLC and alumina layers 508, 510 (FIG. 10) from above the write pole 310. Then, with reference to FIG. 12, a second layer of non-magnetic material 1202 such as alumina is deposited, preferably by a conformal deposition process such as atomic layer deposition (ALD), chemical vapor deposition (CVD) or some similar process. The second non-magnetic layer 1202 is deposited to such a thickness that it can define the thickness of the trailing shield 412. As mentioned above, the first non-magnetic layer 902 was deposited to such a thickness to determine the thickness of the side gaps 410 when added to the second magnetic layer 1202. As can be seen in FIG. 12, the side gaps 410 are defined by the sum of the thickness of both the first non-magnetic layer 902 and the second non-magnetic layer 1202, both of which may be constructed of alumina. This means that when the first magnetic layer 910 is deposited as described in FIG. 9, its deposited thickness should be such that sum of the thicknesses of the layers 902 and 1202 define the desired side gap 410. As mentioned above, the thickness of each of the side gaps 410 is preferably about twice (1.5-2.5 times) that of the trailing shield gap 412. This means that the first and second non-magnetic layers 902, 1202 may be about the same thickness. For example the thickness of the first and second non-magnetic layers 902, 1202 may be 60-80 nm or about 70 nm, resulting in side shield gaps 410 having thicknesses of 120-160 nm or about 140 nm and a trailing shield gap 412 of 60-80 nm or about 70 nm.

Figure 13:
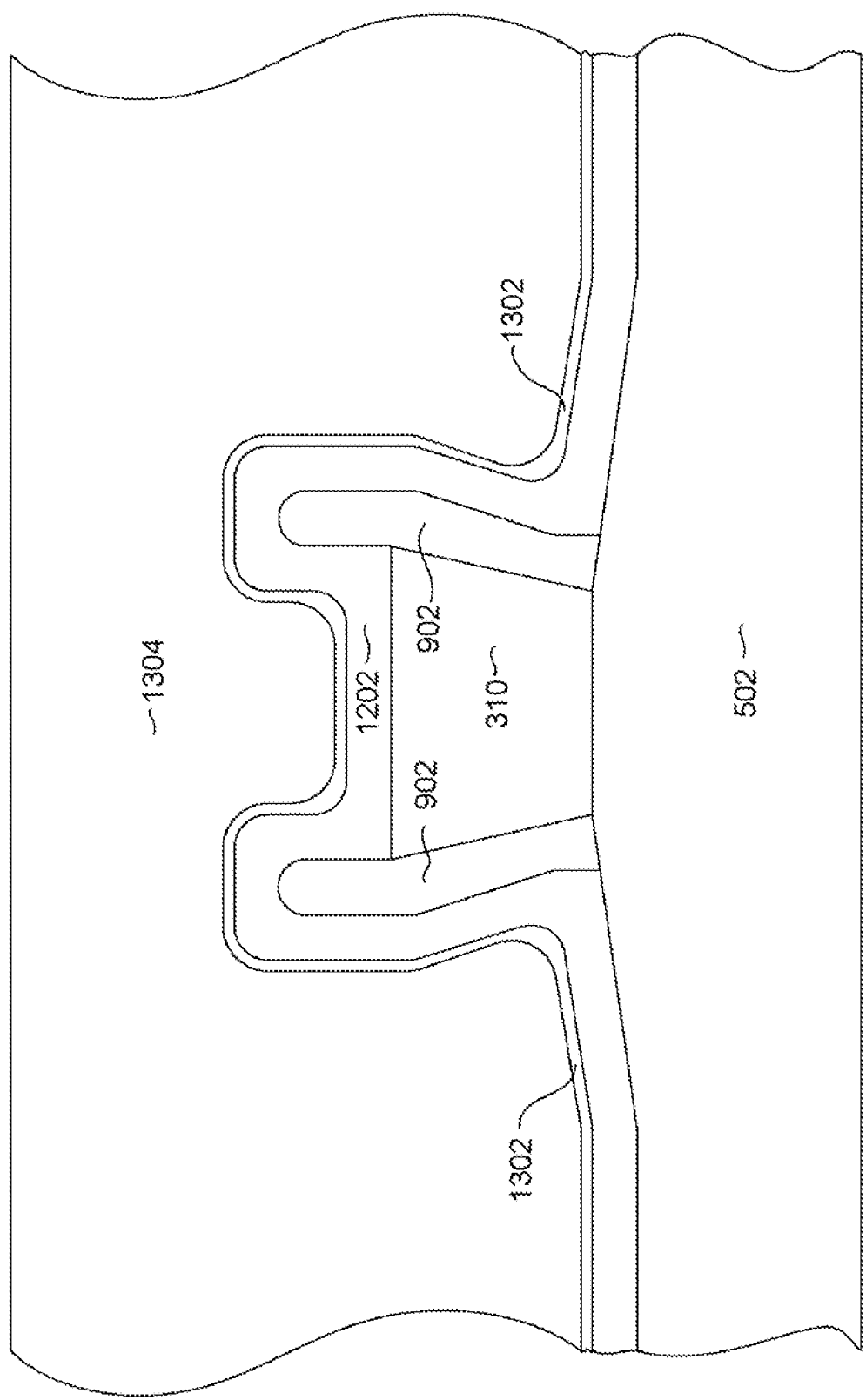

With reference to FIG. 13, a thin, electrically conductive seed layer 1302 is deposited. A photoresist frame (not shown) can then be photolithographically patterned and constructed to define the outer edges of the trailing shield. A magnetic material such as NiFe 1304 can then be electroplated to form the trailing shield 322 as described in FIGS. 3, 4A and 4B.

Figure 14:
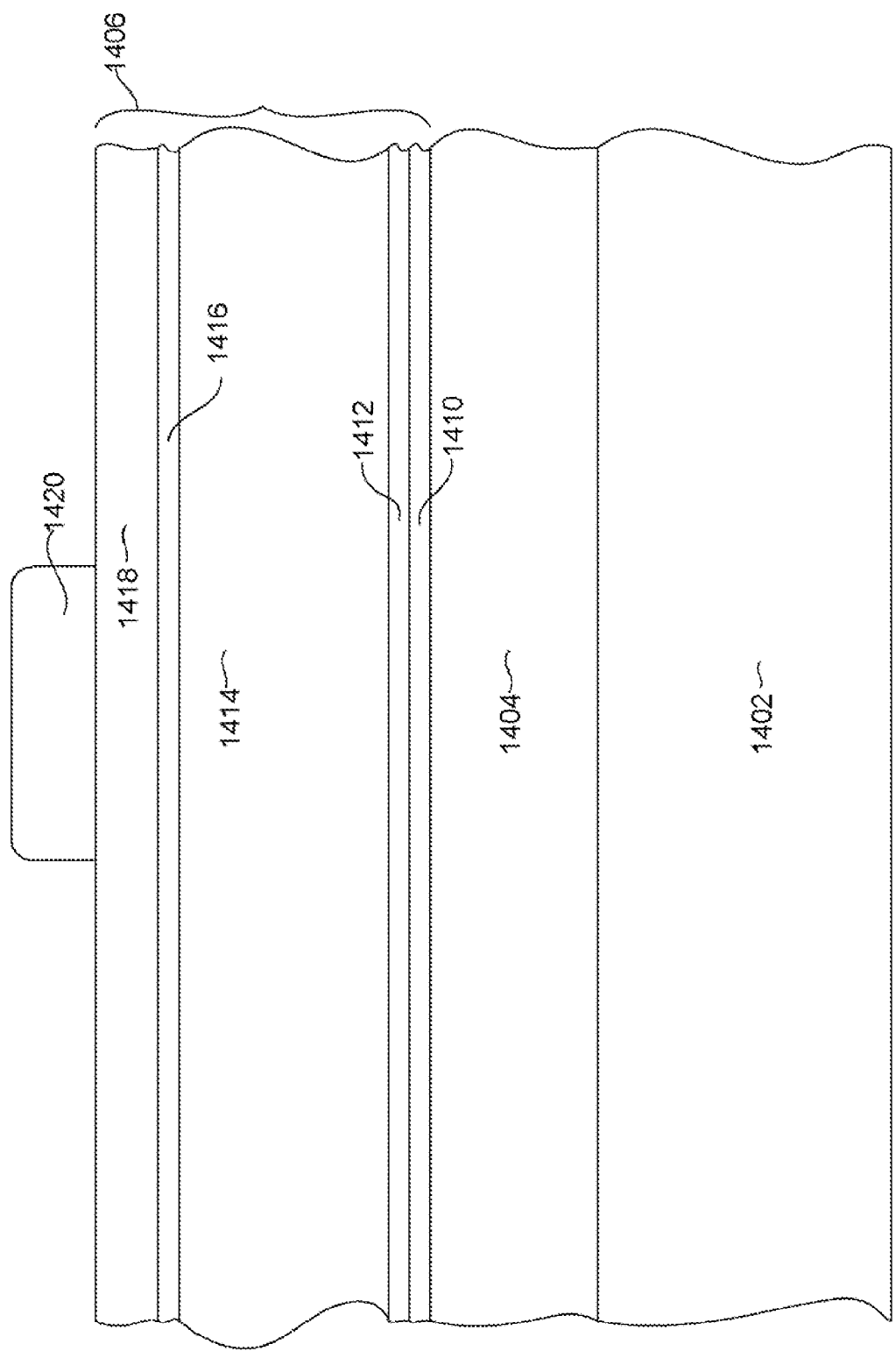
FIGS. 14-23 are ABS views of an magnetic write head in various intermediate stages of manufacture illustrating an alternate method of constructing a magnetic write head according to an embodiment of the invention.

With reference to FIGS. 14-23 another method for constructing a magnetic write pole having a wrap around shield is described. With particular reference to FIG. 14, a substrate 1402, such as an alumina fill layer is provided and a full film layer of write pole material 1404 is deposited over the substrate. A mask structure 1406 is provided over the write pole material 1404. The mask structure 1406 includes a first hard mask structure 1408 that includes a layer of alumina ($Al_2O_3$) 1410 and a layer of diamond like carbon (DLC) 1412 formed thereover. The layer of Alumina 1410 can be 15 to 25 nm or about 20 nm thick. The DLC layer can also be 15 to 25 nm or about 20 nm thick. A first image transfer layer constructed of, for example, DURIMIDE® 1414 is deposited over the hard mask. This first image transfer layer can have a thickness of, for example, 1100 to 1300 nm or about 1200 nm. A second hard mask structure 1416 can then be deposited over the first DURIMIDE® layer 1414. The second hard mask structure 1416 can be constructed of, for example, silicon dioxide ($SiO_2$) and can have a thickness of, for example 50 to 150 nm or about 100 nm. Then, a second image transfer layer 1418, which may also be constructed of DURIMIDE®, can then be deposited over the second hard mask layer 1416. The second image transfer layer 1418 may have a thickness of 40 to 80 nm or about 60 nm. A layer of photosensitive mask material 1420 such as photoresist is then deposited at the top of the mask structure 1406 and is photolithographically patterned to have a desired width and shape for defining a write pole.

Figure 15:
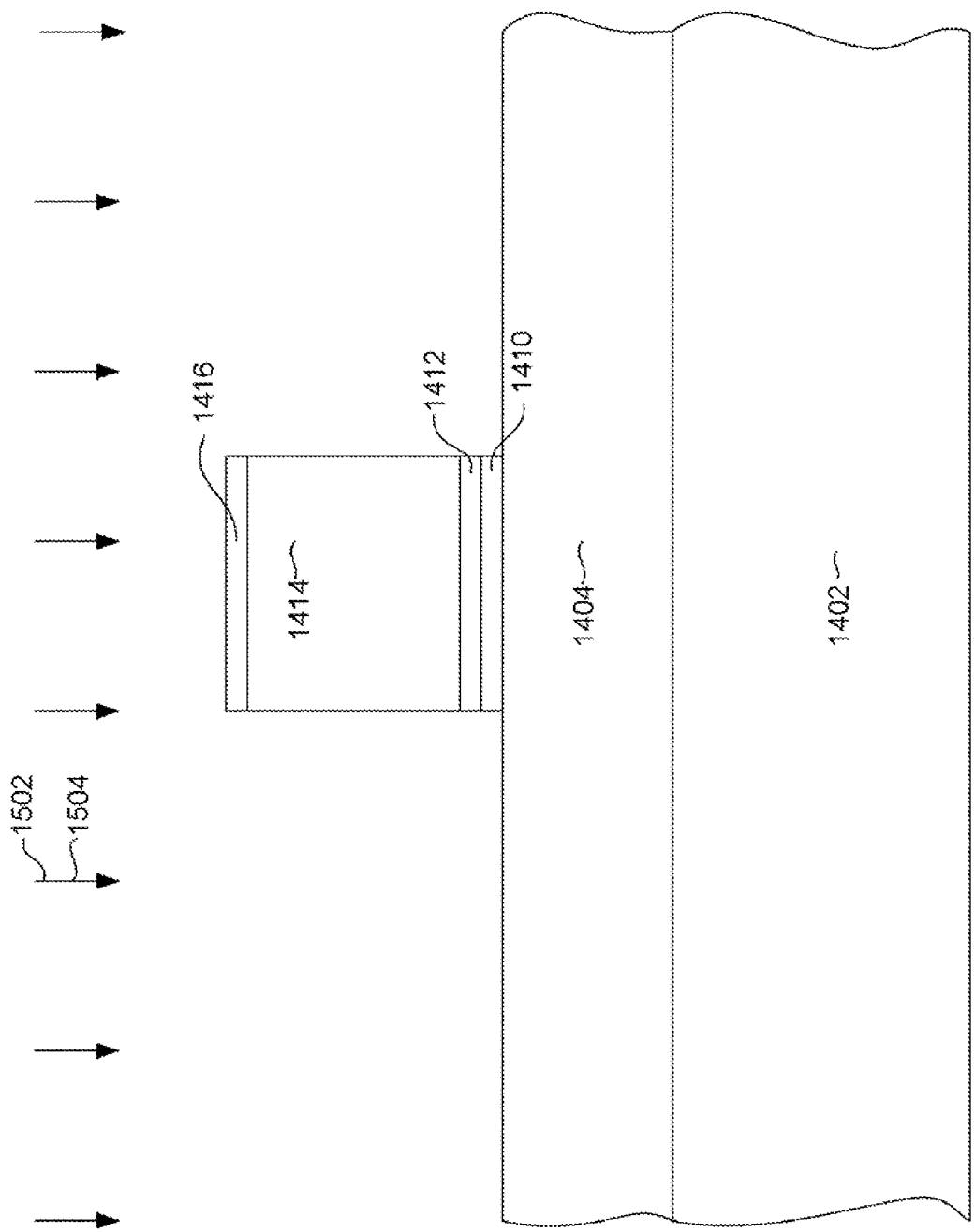

With reference now to FIG. 15, a combination of reactive ion etch (RIE) 1502 and reactive ion milling (RIM) 1504 is performed to transfer the image of the photosensitive mask layer 1420 onto the underlying mask layers 1410-1418, removing all or a portion of layers 1420 and 1418 in the process.

Figure 16:
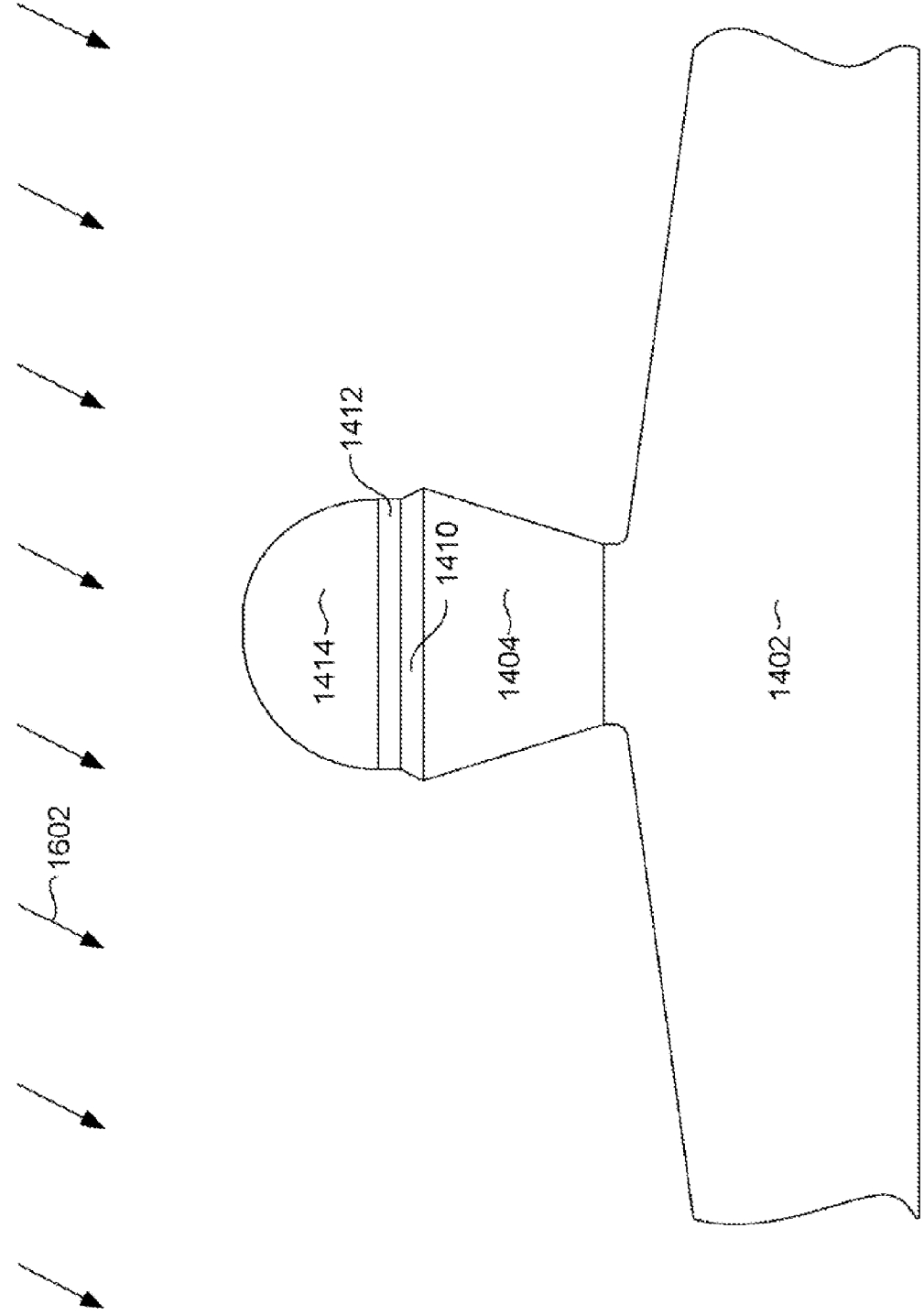

With reference to FIG. 16, an ion mill 1602 is performed to remove write pole material 1404 to form the write pole. The ion mill 1602 is performed at an angle with respect to a normal to the deposited layers in order to form the write pole with the desired trapezoidal shape discussed earlier.

The presence of the second hard mask layer 1416 (FIG. 14) provides improved control of write pole critical dimensions, by preserving sufficient mask material during the combination RIE and RIM processes 1502, 1504 (FIG. 15) for use in the subsequent ion milling process 1602 (FIG. 16). The combination of reactive ion etch (RIE) and reactive ion milling (RIM) are performed to effectively remove both the DLC layer 1412 and the alumina layer 1410.

Figure 17:
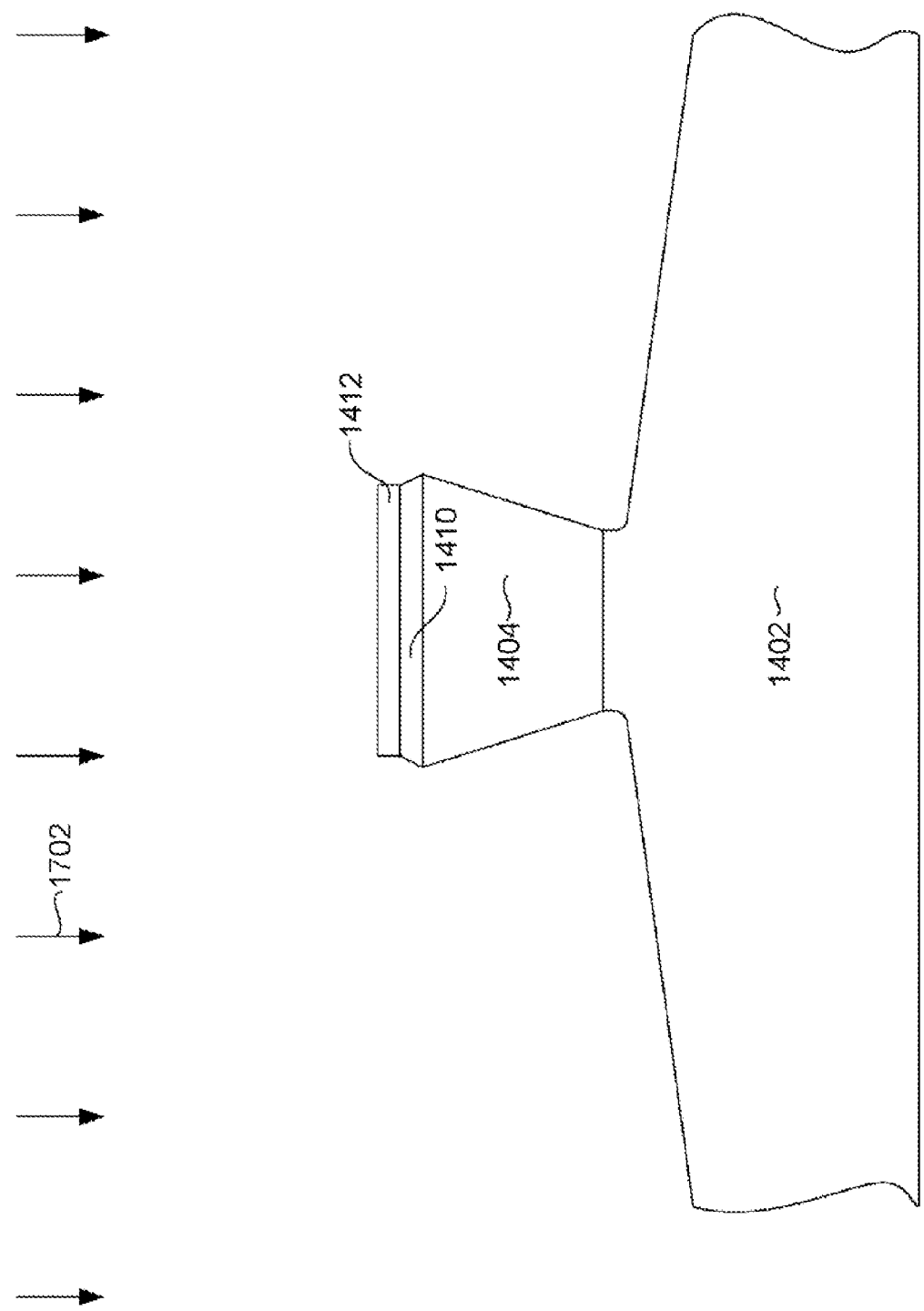
Figure 18:
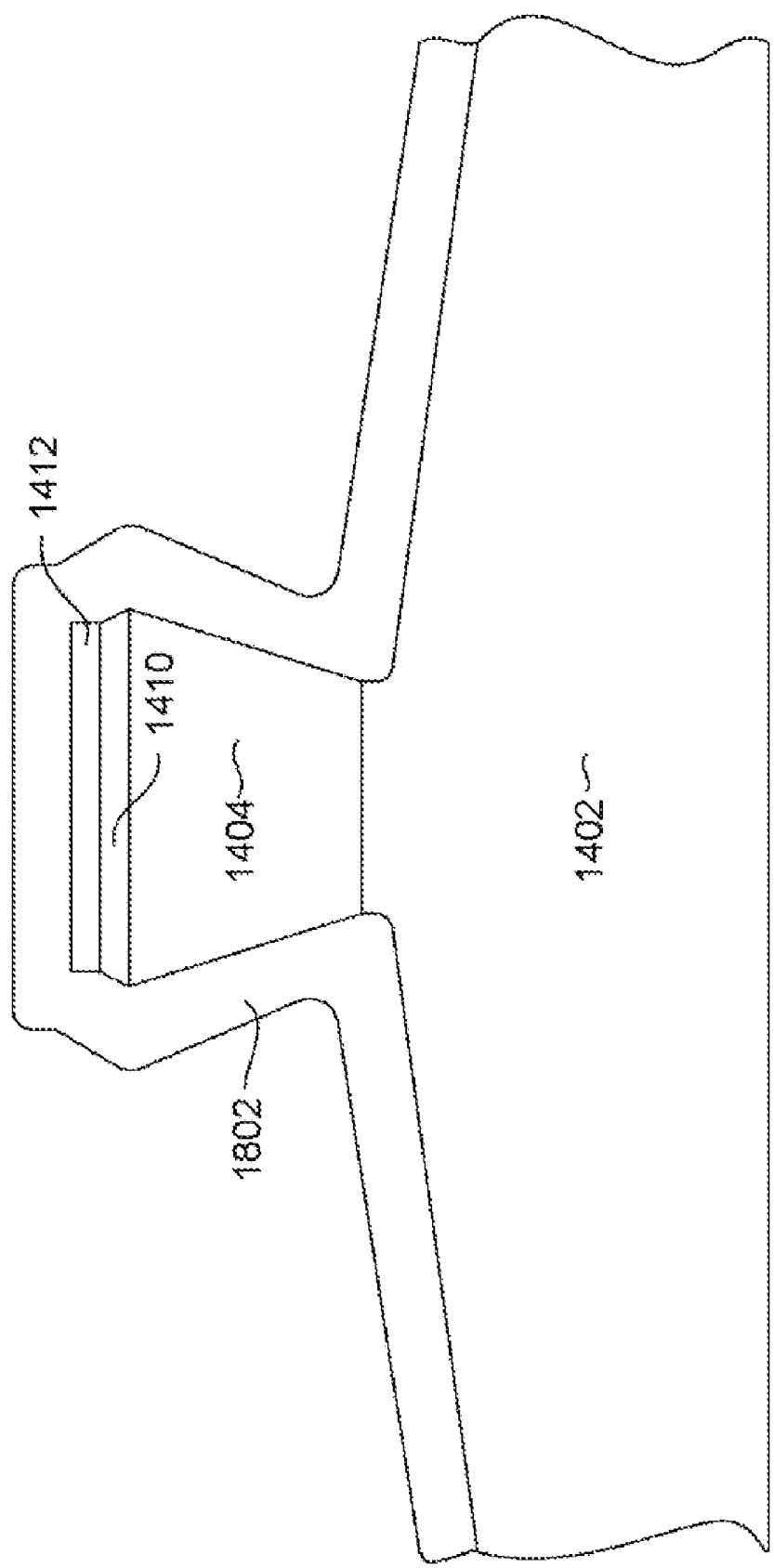
Figure 19:
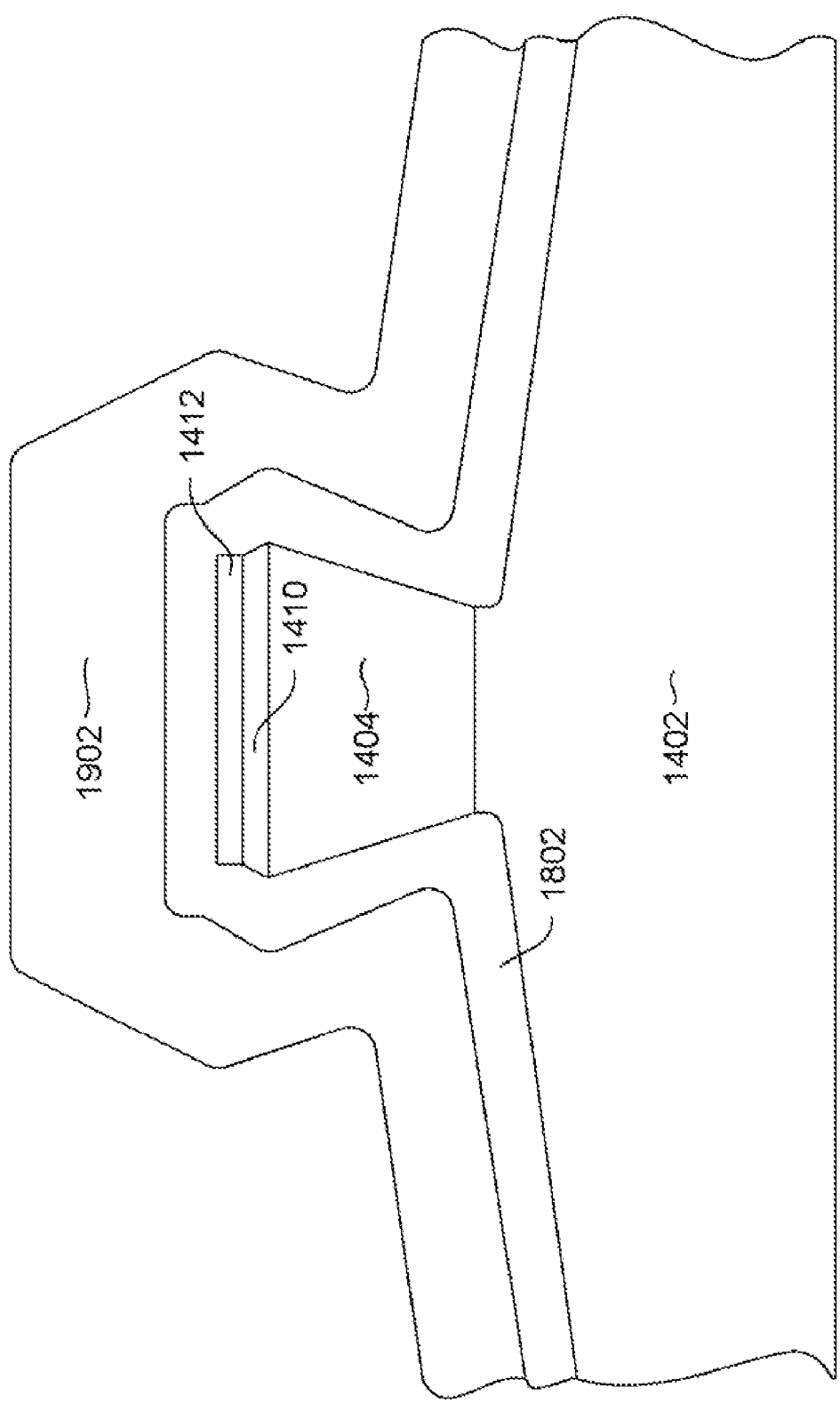

With reference now to FIG. 17, a TMAH developer etch (tetramethyl ammonium hydroxide) 1702 is performed to remove the remaining image transfer layer 1414. With reference now to FIG. 18, a layer of Rh 1802 is deposited, preferably by sputter deposition. The Rh layer 1802 can be, for example, 25 to 35 nm or about 30 nm. With reference now to FIG. 19, a layer of non-magnetic material 1902 such as alumina is deposited over the Rh layer 1802. The alumina layer 1902 is preferably deposited by a conformal deposition method such as atomic layer deposition (ALD), chemical vapor deposition (CVD) etc, and may have a thickness of 60-80 nm or about 70 nm.

Figure 20:
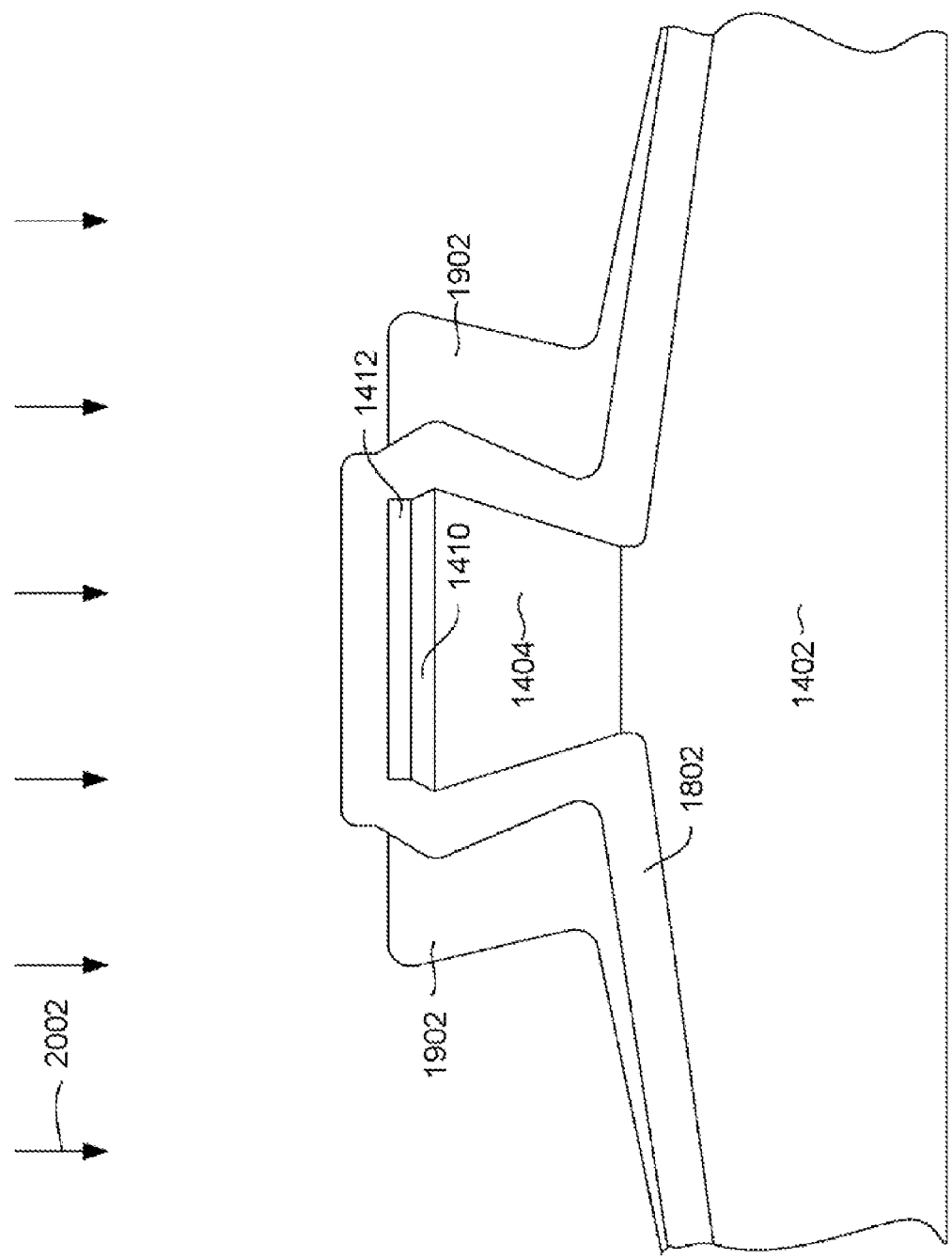
Figure 21:
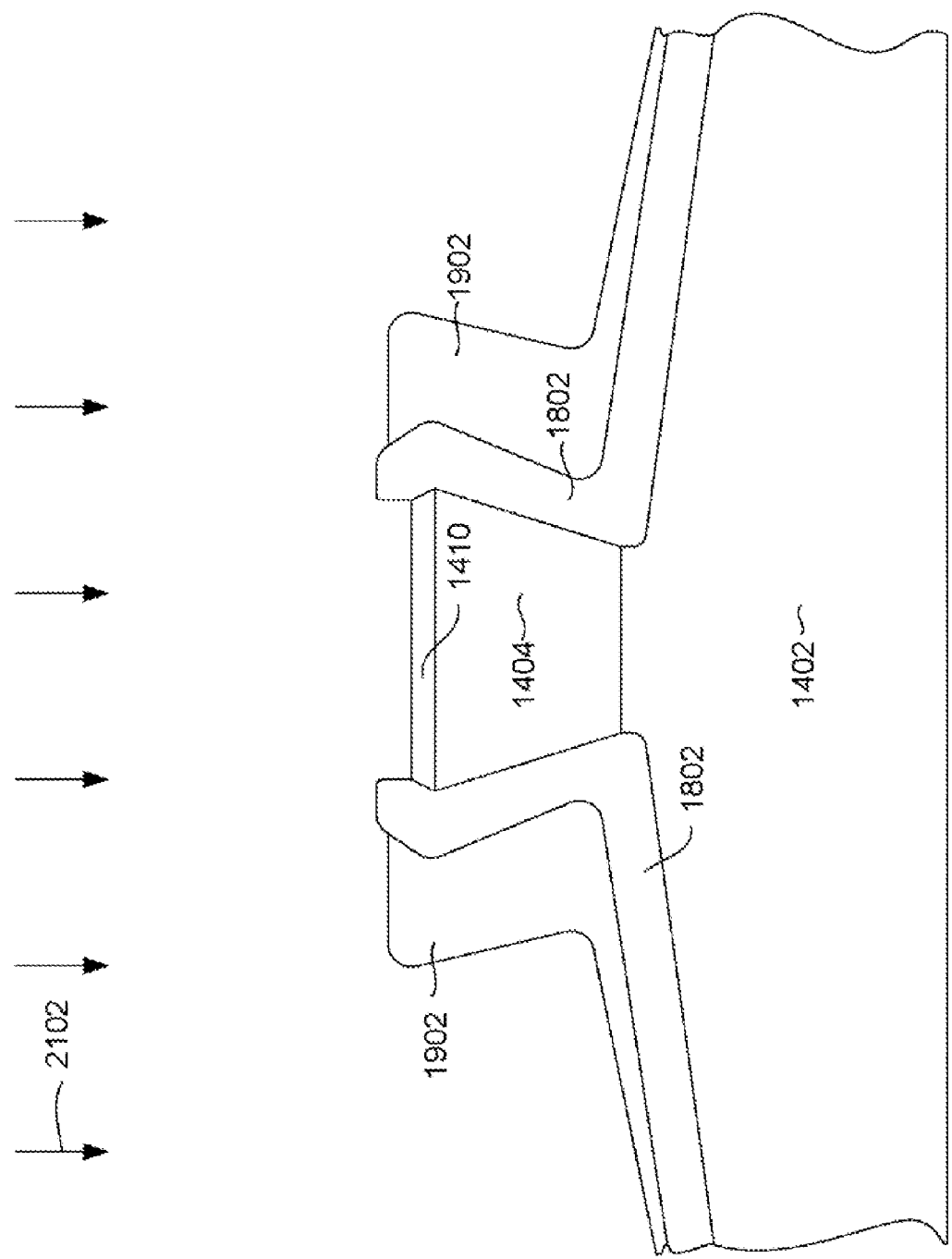

With reference now to FIG. 20, a reactive ion mill (RIM) is performed to preferentially remove horizontally disposed portions of the alumina layer 1902, leaving the underlying Rh layer 1802 exposed at the top (trailing edge) of the write pole. Then, with reference to FIG. 21, a reactive ion etch (RIE) is performed to remove the exposed portions of the Rh layer 1802, and also the DLC layer 1412 from the top of the write pole 1404.

Figure 22:
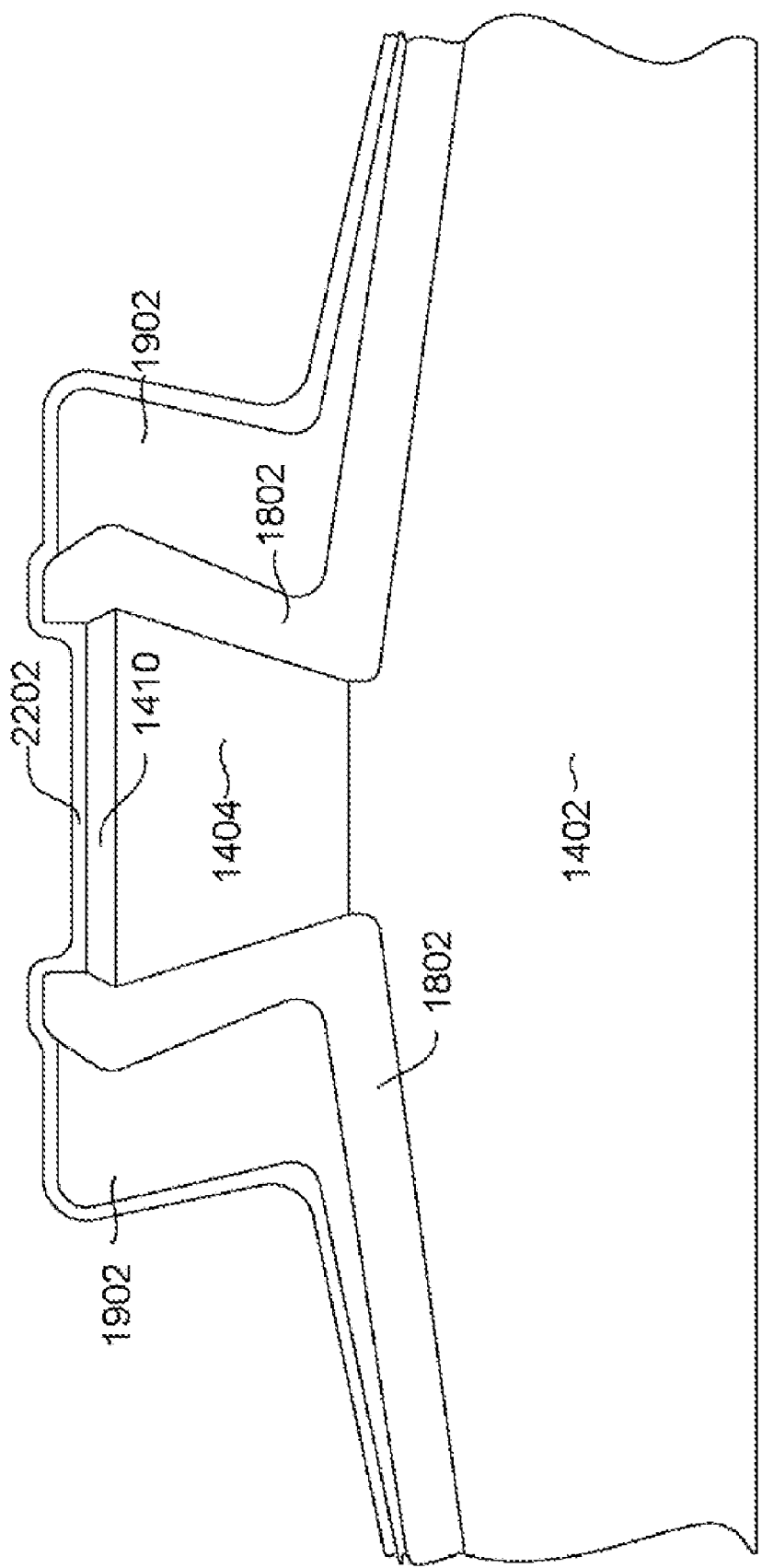
Figure 23:
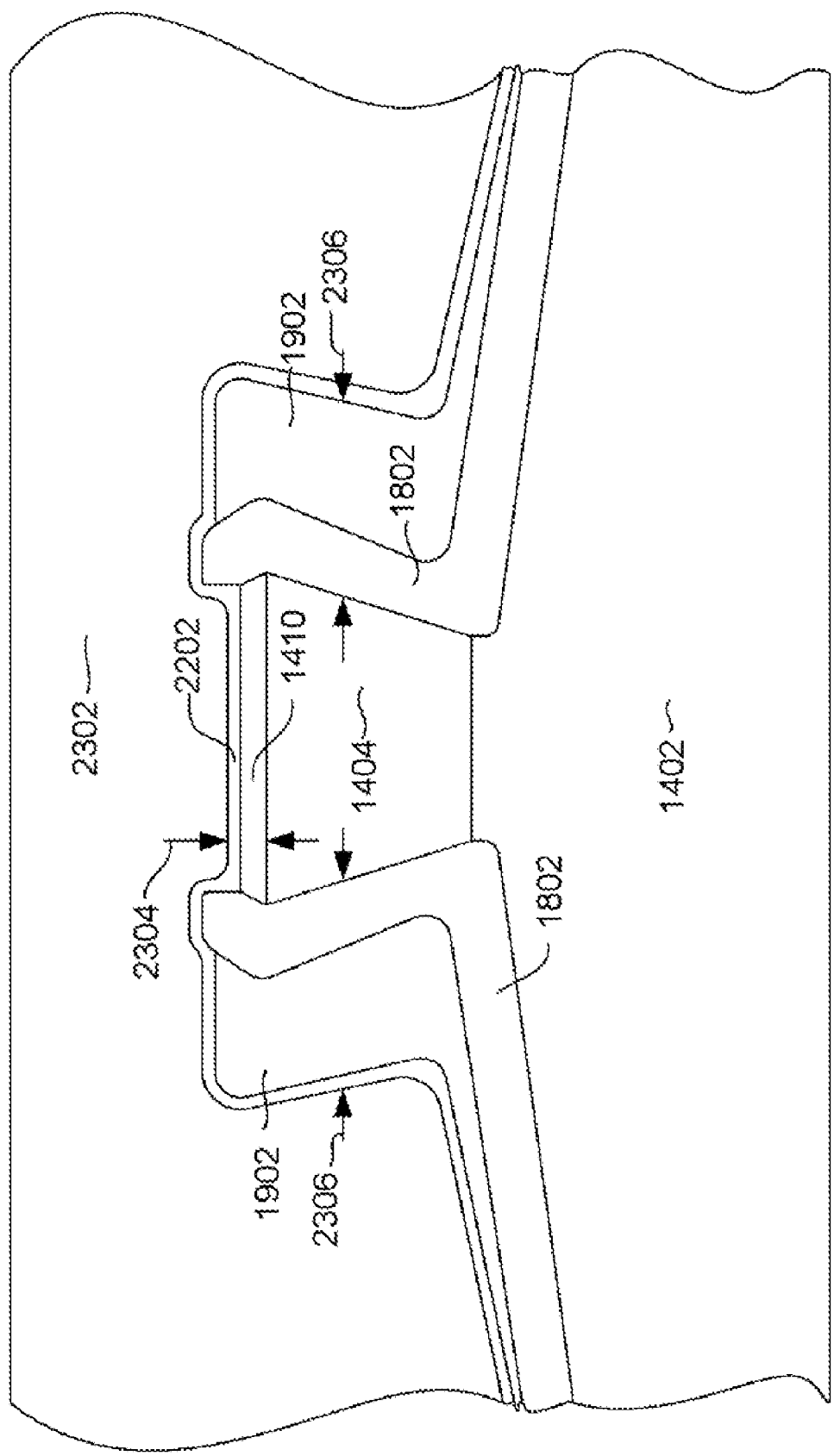

With reference to FIG. 22, an electrically conductive seed such as Rh 2202 is deposited. This seed layer 2202 is preferably sputter deposited and has a negligible thickness as compared with the other layers. With reference now to FIG. 23, a magnetic material 2302, such as NiFe can be electroplated, using the electrically conductive Rh as a plating seed. This magnetic material 2302 forms a wrap around trailing shield having well controlled side gap and trailing gap thicknesses.

As can be seen with reference to FIG. 23, the trailing gap 2304 is defined by the thickness of remaining alumina layer 1410, whereas the side shield gap 2306 at each side of the write pole 1404 is determined by the sum of the thicknesses of the alumina layer 1802 and the Rh layer 1902. Therefore, the trailing gap thickness 2304 and side gap thicknesses 2306 can be accurately controlled by controlling the thickness of the deposited layers 1410, 1802 and 1902.

At this point, a discussion of the bi-layer hard mask structure described in FIGS. 14 through 16 is warranted. Alumina provides an excellent hard mask for defining the critical width dimensions of the write pole. Another advantage of using alumina as a hard mask is that TMAH developer (tetramethyl ammonium hydroxide) can be used to lift off fencing resulting from the ion process, without issues related to CMP liftoff processes.

However, in order for the alumina layer alone function effectively as a hard mask and withstand the ion milling, it must be deposited about 75 nm thick. This is much thicker than the desired trailing shield gap thickness. One cannot simply reduce the alumina hard mask thickness to the 20 nm or so needed for the trailing gap, as there would not be sufficient hard mask to achieve high level angle and critical dimension control for the write pole. Therefore, the use of alumina alone as the hard mask would require an extra step of removing the alumina and then depositing another material layer to function as the trailing shield gap. Using a bi-layer hard mask affords the advantage of using an alumina hard mask, while also being able to use the alumina portion of the hard mask as a trailing shield gap.

Figure 24:
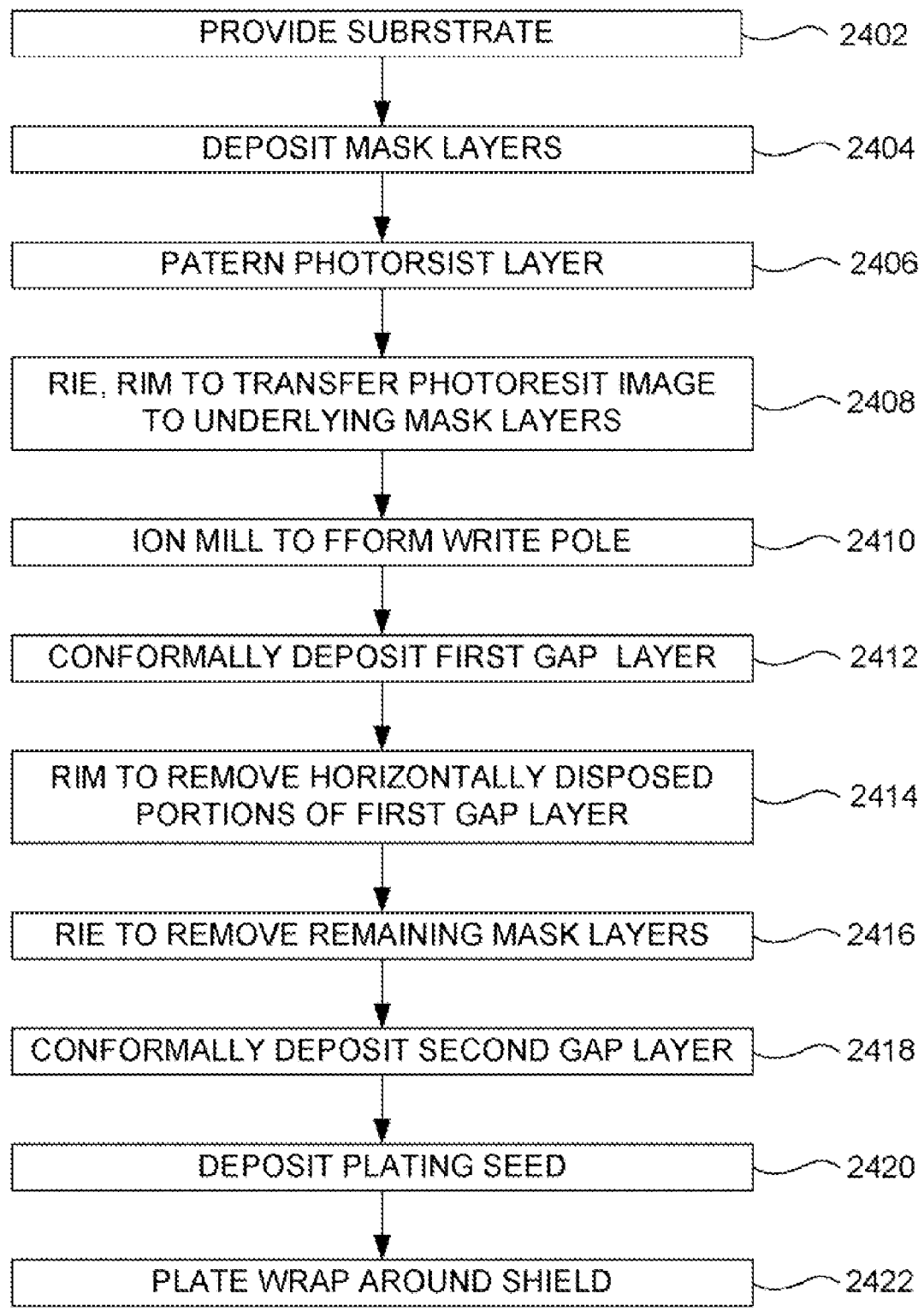
FIGS. 24 and 25 are flow charts illustrating methods of manufacturing a magnetic write head.

With reference to FIG. 24, a method for constructing a sensor as described back in FIGS. 5 through 13 is summarized as follows. In a step 2402 a substrate is provided. The substrate can be a combination of an alumina fill layer and a magnetic shaping layer, both forming a smooth coplanar surface. Then, in a step 2404 a series of mask layers are deposited. The mask layers can include a hard mask which may be a single layer of alumina or some other suitable material or may be a multilayer hard mask such as one that includes a layer of alumina and a layer of diamond like carbon (DLC) formed thereover. The other mask layers may include one or more image transfer layers, such as a layer of DURIMIDE®, and a layer of photoresist at the top.

In a step 2406, the photoresist layer at the top of the mask structure is photolithographically patterned, and in step 2408 the image of the photoresist is transferred to the underlying mask layers. The image transfer can be performed by a combination of reactive ion etch (RIE) and reactive ion milling (RIM). Then, in a step 2410 an ion mill is performed to form the write pole. The ion mill is preferably performed at an angle to create a write pole having a desired trapezoidal shape. In a step 2412 a first shield gap layer material is deposited, preferably by a conformal deposition process. The first gap layer can be constructed of, for example alumina and can be deposited by a process such as, for example atomic layer deposition (ALD), chemical vapor deposition (CVD) or some similar deposition method.

In a step 2414 a reactive ion mill is performed to remove horizontally disposed portions of the first gap layer, thereby opening up the gap layer over the write pole and exposing any mask layers still remaining over the write pole. Then, in a step 2416 a reactive ion etch (RIE) is performed to remove the remaining mask layers from over the top of the write pole. In a step 2418 a second gap layer is deposited, also by a conformal deposition process such as ALD or CVD. Like the first gap layer, the second gap layer can be constructed of alumina or some other material. Then, in a step 2420 an electrically conductive plating seed is deposited. The plating seed can be, for example Rh. Then, in a step 2422 the wrap around trailing shield can be formed by electroplating a magnetic material such as NiFe or some other magnetically permeable material.

Figure 25:
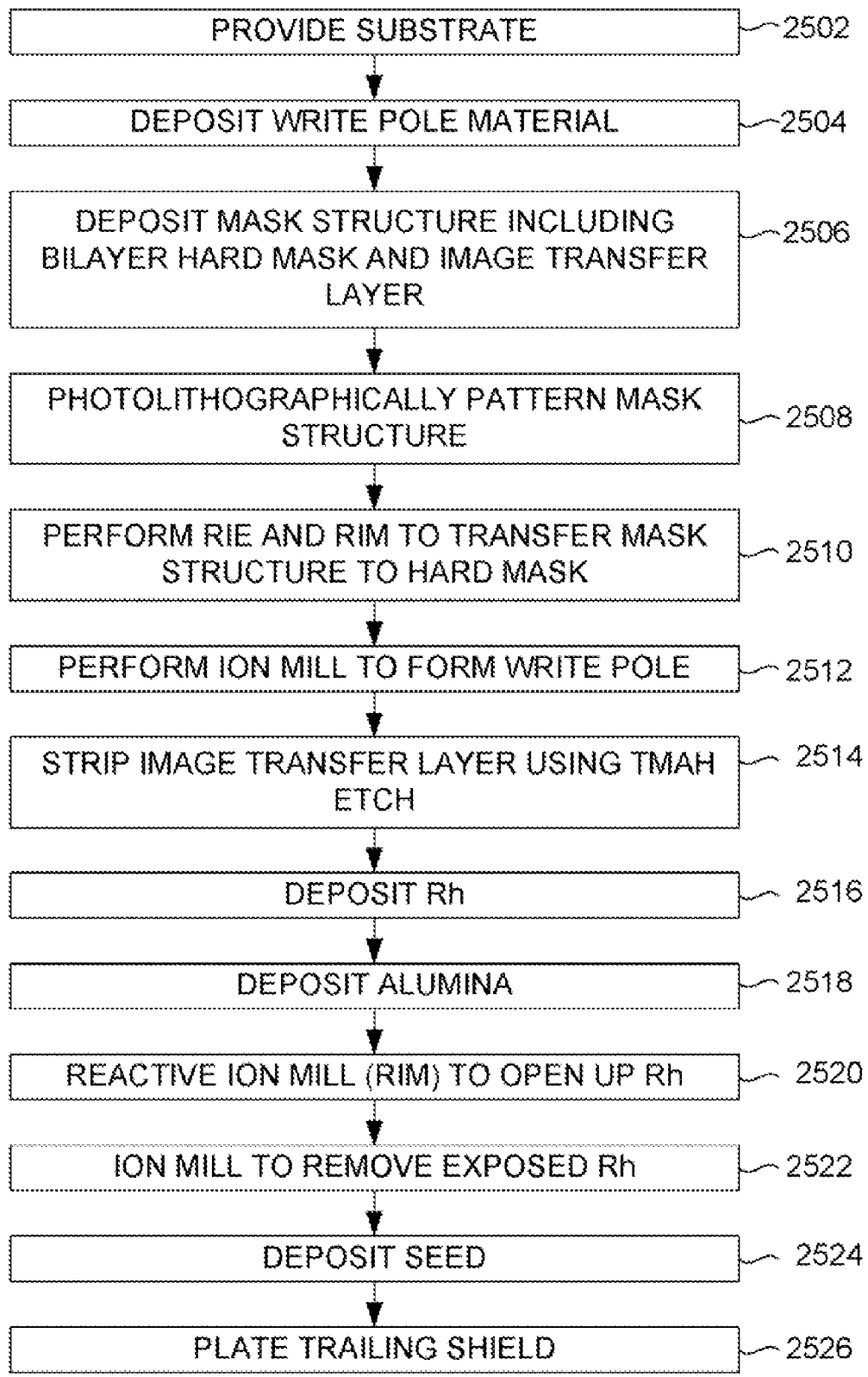

With reference now to FIG. 25, a method for constructing a sensor as described in FIGS. 14-23 can be summarized as follows. First in a step 2502 a substrate is provided, this can be for example a combination of alumina fill and a magnetic shaping layer, both of which have a smooth coplanar surface. Then, in a step 2504 one or more layers of write pole material is deposited on the substrate. In a step, 2506 a mask structure is deposited. The mask structure includes a bi-layer hard mask at the bottom of the mask structure, the bi-layer hard mask including a layer of alumina and a layer of DLC formed on the alumina. The mask structure also includes an image transfer layer, which may have another hard mask layer interposed in a layer of DURIMIDE®. The mask structure also includes a photoresist layer at the top. In a step 2508, the photoresist layer at the top of the mask structure is photolithographically patterned. Then, in a step 2510 a combination of reactive ion etching (RIE) and reactive ion milling (RIM) is performed to transfer the image of the photoresist layer on the underlying layers of the mask.

In a step 2512 an ion mill is performed to form the write pole. The ion mill is preferably performed at an angle in order to form a desired trapezoidal write pole. In a step 2514, any remaining DURIMIDE is stripped using a TMAH etch. Then, in a step 2516, a layer of Rh is deposited. In a step 2518 a layer of alumina is deposited. Then, in a step 2520 a reactive ion mill (RIM) is performed to open up the Rh layer at the top of the write pole. In a step 2522 another ion mill is performed to remove the Rh that was exposed in the previous RIM process 2520. Then, in a step 2524 an electrically conductive seed layer, such as Rh is deposited so that the wrap around trailing shield can be plated in a step 2526.

Figure 26:
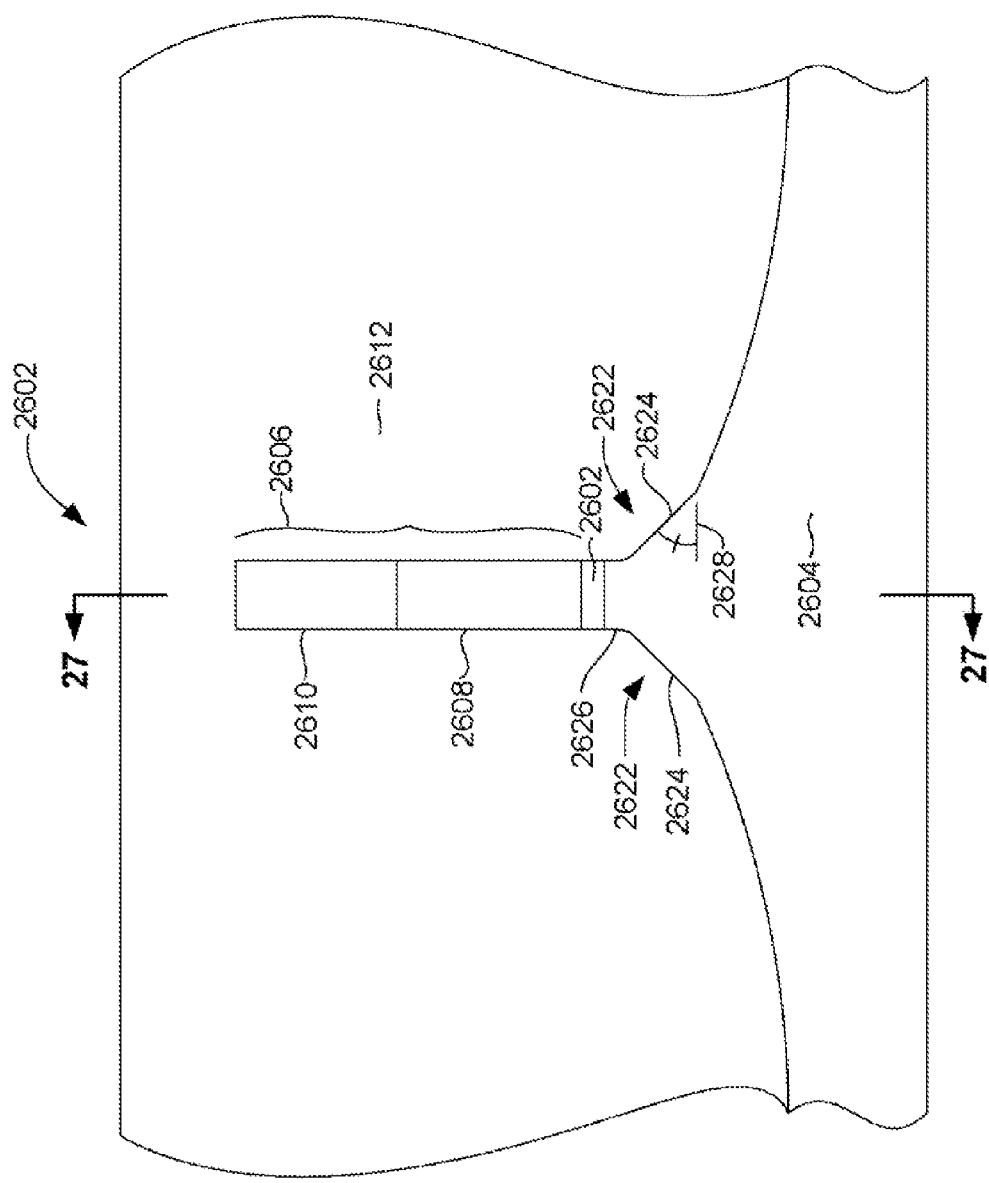
FIG. 26 is an ABS view of a longitudinal write head according to an embodiment of the invention.

With reference now to FIG. 26 a longitudinal write pole according to an embodiment of the invention is described. FIG. 26 shows a longitudinal write head 2602 as viewed from the air bearing surface ABS. The write head 2602 includes a bottom pole structure 2604 and a top pole structure 2606. The bottom pole structure (P1) 2604 may be constructed as a single magnetic layer, while the top pole structure 2606 may be constructed as multiple layers including a P2 pole structure 2608 and a P3 pole structure 2610. An insulator fill material 2612 fills the area around the poles 2604, 2606 as viewed from the ABS.

Figure 27:
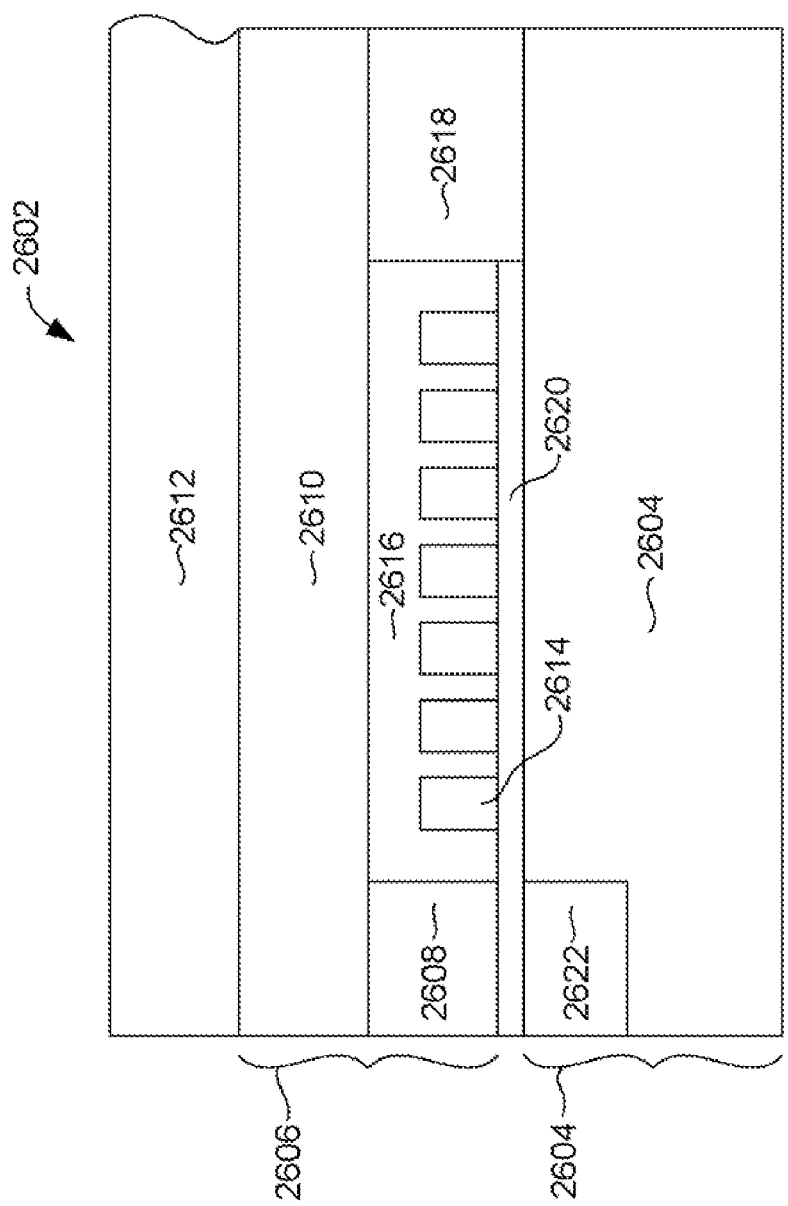
FIG. 27 is a cross sectional view, taken from line 27-27 of FIG. 26, of a longitudinal write head according to an embodiment of the invention.

With reference to FIG. 27, the write head 2602 includes a write coil 2614 that passes between the top and bottom poles 2604, 2606. The coil 2614 is encased in a non-magnetic, electrically conductive insulation layer 2616 that may be, for example, alumina. A magnetic back gap layer 2618 magnetically connects the top and bottom poles 2604, 2606 at the back of the write head 2602. A layer of write gap material 2620 is formed on the top of a portion of the bottom pole and forms a write gap between the top and bottom poles 2604, 2606. The write gap can be constructed of several non-magnetic materials such as alumina, silicon dioxide, etc. When current flows through the coil 2616, a magnetic field is generated that flows through the poles 2604, 2606. This field fringes out across the write gap at the ABS causing a fringing field that writes a magnetic bit onto an adjacent magnetic medium (not shown).

The first pole is configured with a notch 2622 that has a steep shoulder 2624. The notch may have a substantially vertical portion 2626 that may extend about 0 to 10 nm from the top of the bottom pole (P1) to the beginning of the steep shoulder portion 2624. At least a portion of the steep shoulder portion 2624 preferably forms an angle 2628 of 40-50 degrees or about 45 degrees with the planes defined by the deposited layers. This angle has been found to provide the best balance between avoiding stray magnetic fields and preventing pole tip saturation, as will be explained further below.

This steep shouldered notch 2622 advantageously prevents stray fields from occurring while also preventing saturation of the pole tip. Stray fields create a problem, because they can lead to adjacent track interference. Without the steep shouldered notched structure 2622 shown particularly in FIG. 26, magnetic fields extending between the P2 layer 2608 and the P1 layer 2604 would tend to extend outward to the sides of the P1 layer.

Figure 28:
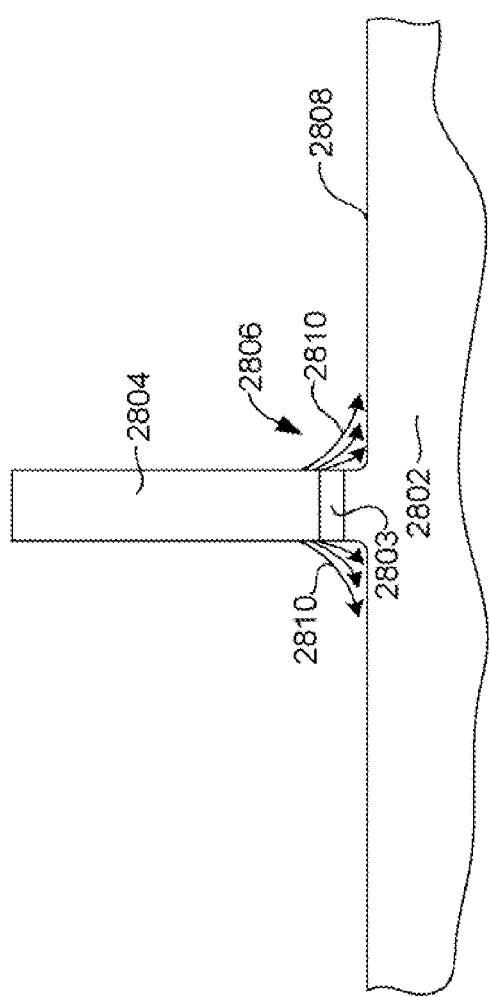
FIG. 28 is an ABS view of a prior art longitudinal write head.

Such a disadvantageous side extending magnetic field can be seen with reference to FIG. 28, which shows an ABS view of a prior art write lead configured without the steep shouldered notch of the present invention. As can be seen, the prior art pole structure has a bottom pole 2802 and a top pole 2804 with a notch 2806 formed in the bottom pole that extends straight down and then terminates at an essentially horizontal or slightly sloping surface 2808. A non-magnetic write gap 2803 is formed between the top and bottom poles 2802, 2804.

As magnetic field extends between the top and bottom pole 2802, 2804, a significant portion of the field 2810 extends outward beyond the sides of the intended write width, the field being attracted to the horizontal portion of the bottom pole 2802. Merely increasing the depth of the notch 2806 a substantial amount downward would prevent side writing, but would also lead to magnetic saturation of the pole tip and would, therefore, result in substantially decreased magnetic performance of the write head. Therefore, there is a need for a write head design that can prevent such side reading, while also avoiding magnetic saturation of the write pole tip. The present invention, an embodiment of which is described in FIGS. 26 and 27, solves this problem by providing such a write head design.

Figure 29:
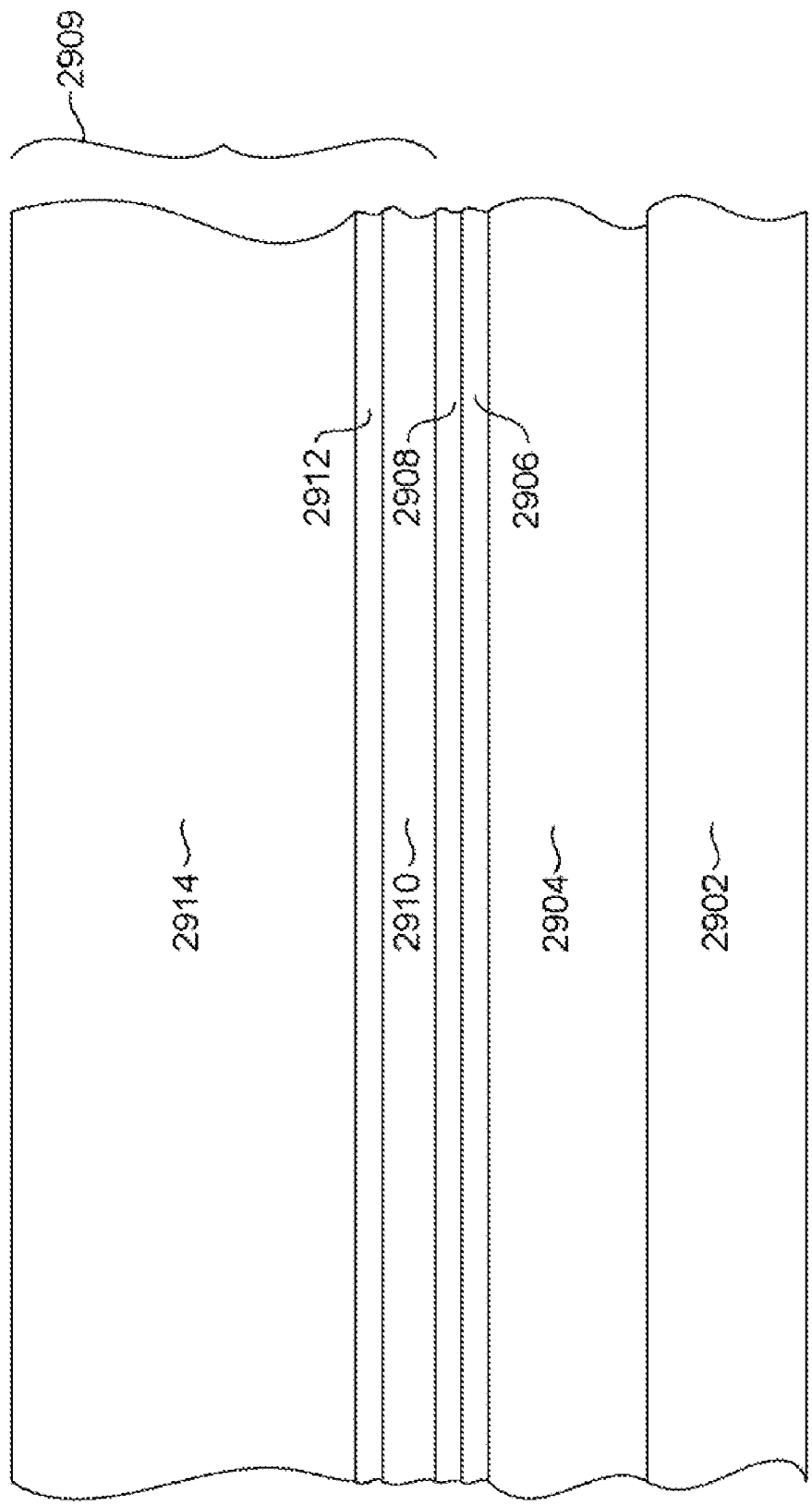
FIGS. 29-36 are ABS views of a longitudinal write head in various intermediate stages of manufacture illustrating a method of manufacturing a write head according to an embodiment of the invention.

With reference again to FIG. 29-36, a method of constructing a write pole having a steep shoulder notch according to the present invention is described. With particular reference to FIG. 29, a substrate 2902 such as an alumina layer or some other non-magnetic layer is provided. A first layer of magnetic material 2904 is then deposited to provide the lower magnetic pole P1 2604 described with reference to FIGS. 26 and 27. The first magnetic layer can be a magnetic material such as NiFe or some other suitable material. A write gap material 2906 is deposited over the P1 layer. The write gap material can be, for example alumina or some other non-magnetic material. An electrically conductive seed layer 2908 is then formed over the write gap layer 2906 to provide an electrically conductive surface on which to subsequently electroplate the P2 pole as will be described below. The seed layer can be formed of various materials and is preferably constructed of the material that will make up the P2 pole, such as NiFe or CoFe.

With continued reference to FIG. 29 a mask structure 2909 formed over the P2 seed layer 2908 includes a layer of material that is removable by reactive ion etching (RIEable film) 2910. The RIEable film 2910 can be, for example, $SiO_2$, SiN, Si, Ta, $Ta_2O_5$, DLC Tungsten, DURIMIDE®, etc, and can be deposited to a thickness of about 80 nm. A layer of Polymethylglutarimide (PMGI film) 2912, or some similar material, is deposited over the RIEable film layer 2910. The PMGI layer can be deposited to a thickness of about 60 nm. A deep UV photoresist layer 2914 is deposited over the PMGI layer. The photoresist layer 2914 can be deposited by spinning it onto the wafer as a film. Because it is a deep UV photoresist, the layer 2914 can be deposited relatively thick, such as about 4 um.

Figure 30:
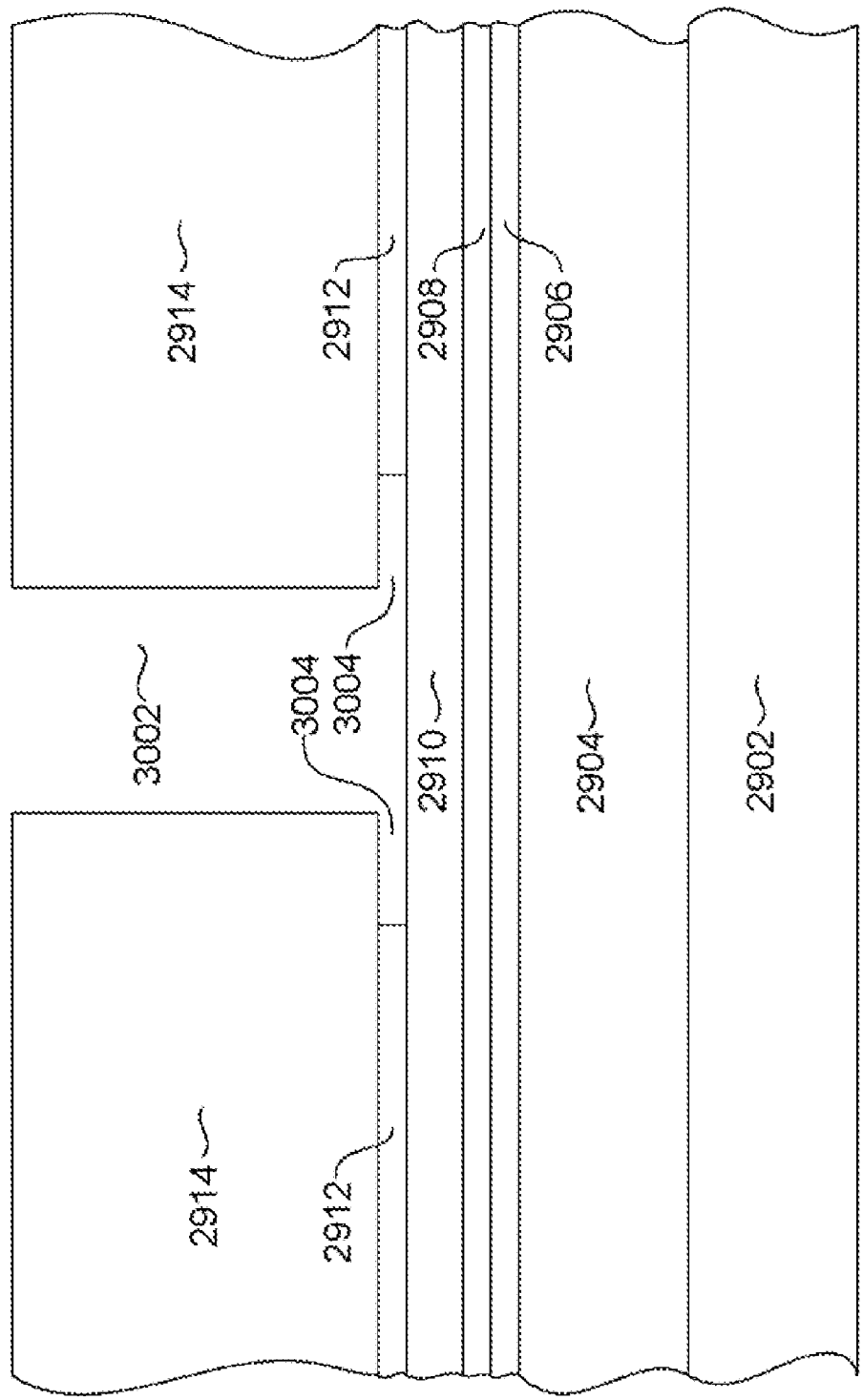

With reference to FIG. 30, the photoresist layer can be photolithographically patterned by a deep ultraviolet (deep UV) photolithography to form a trench 3002 having desired dimensions for forming a P2 pole piece. The process of exposing and developing the photoresist layer 2914 not only results in the trench 3002, but also forms an undercut 3004 in the PMGI layer 2912. The undercut 3004 may extend about 0.1 to 0.2 um laterally outward beyond the edges of the trench 3002 formed in the photoresist layer 2914.

Figure 31:
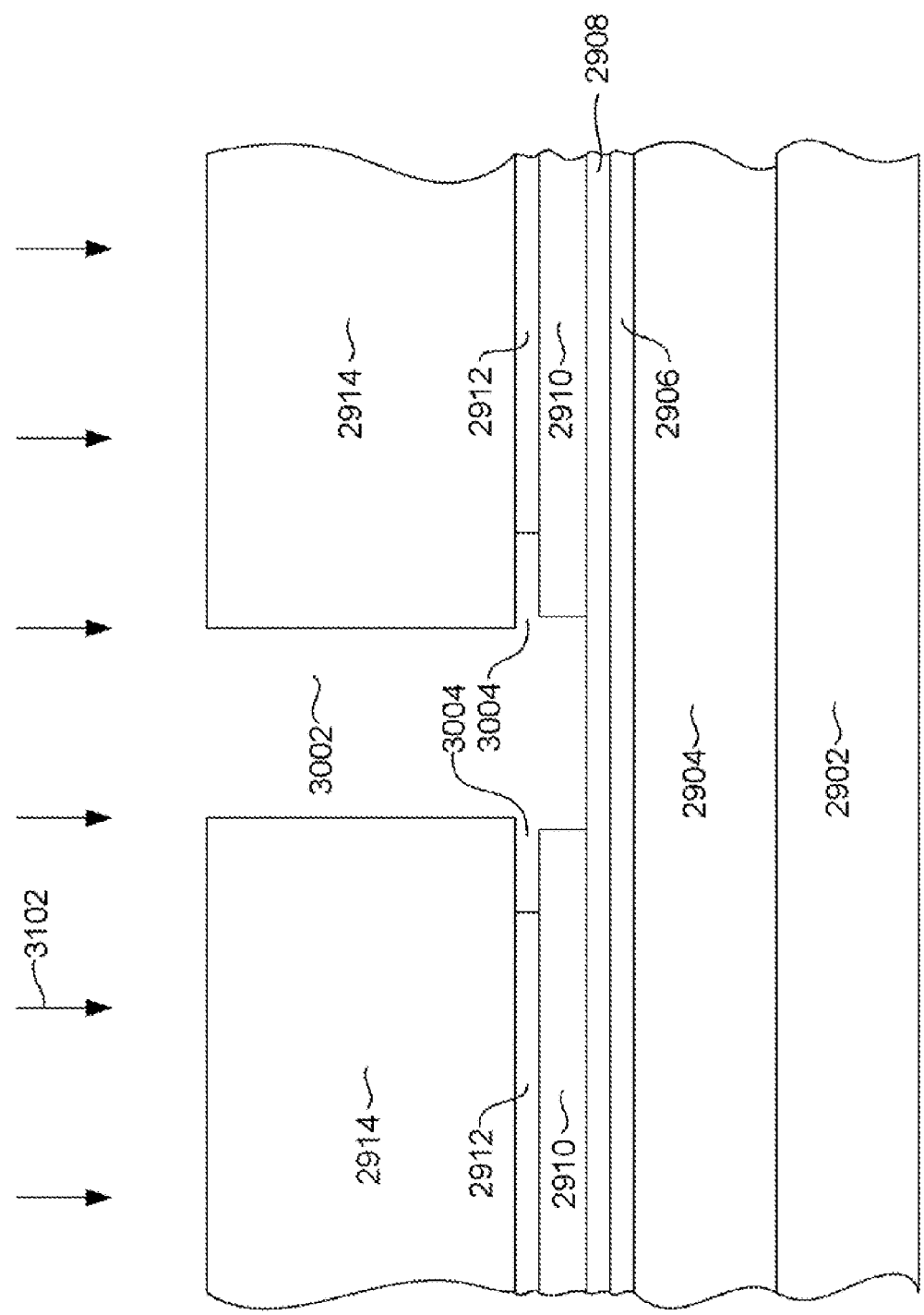

With reference now to FIG. 31, a reactive ion etch (RIE) 3102 is performed to remove portions of the RIEable layer 2910 that are exposed by the trench 3002 formed in the photoresist layer 2014. As can be seen in FIG. 31, the removed portion of RIEable film 2910 has a width that is slightly larger than the width of the trench 3002, but that is significantly smaller than the outermost portions of the undercuts 3004.

Figure 32:
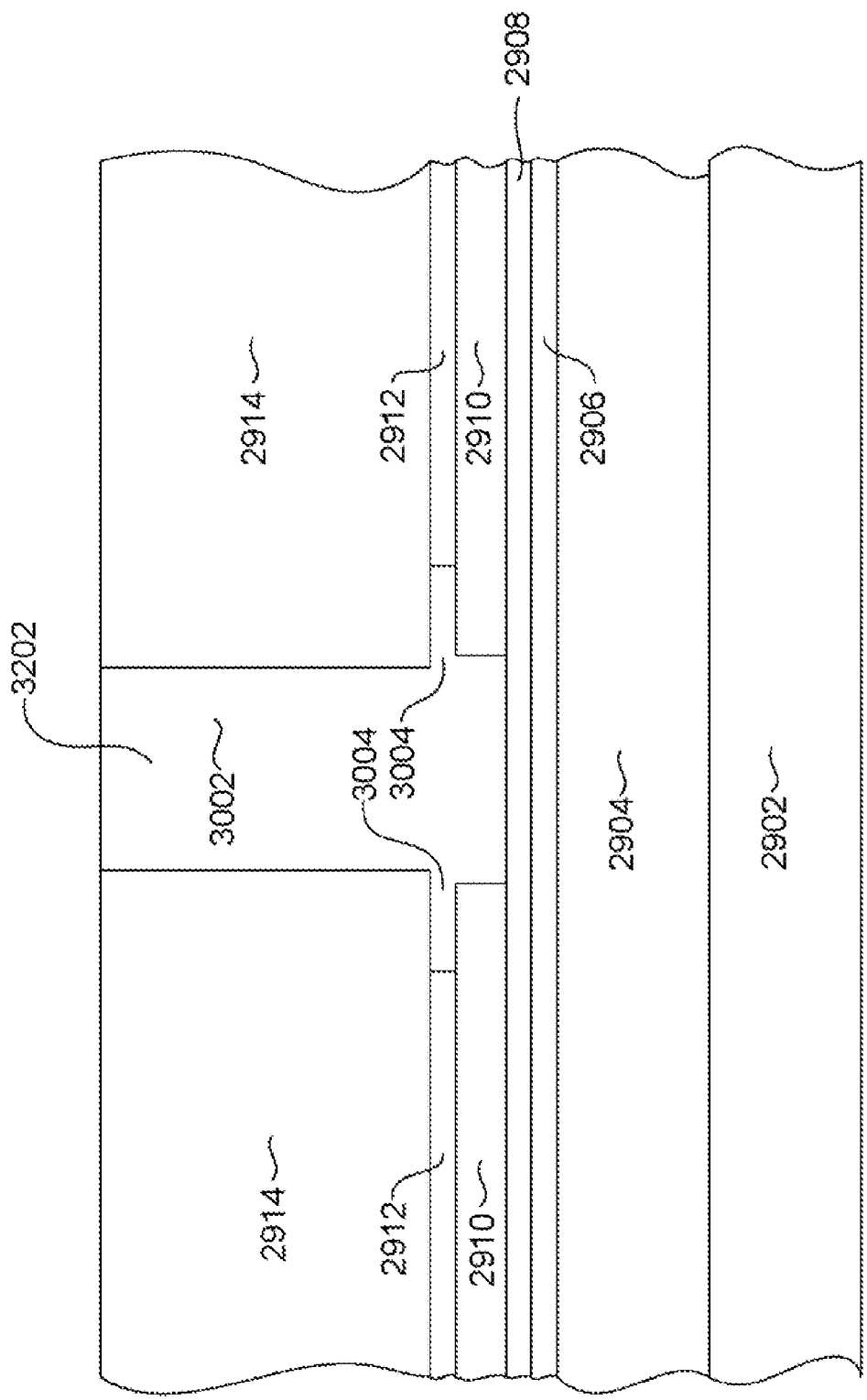

With reference now to FIG. 32, a magnetic material 3202 such as NiFe or CoFe is electroplated into the trench 3002, with the magnetic material 3202 extending into the undercuts 3004.

Figure 33:
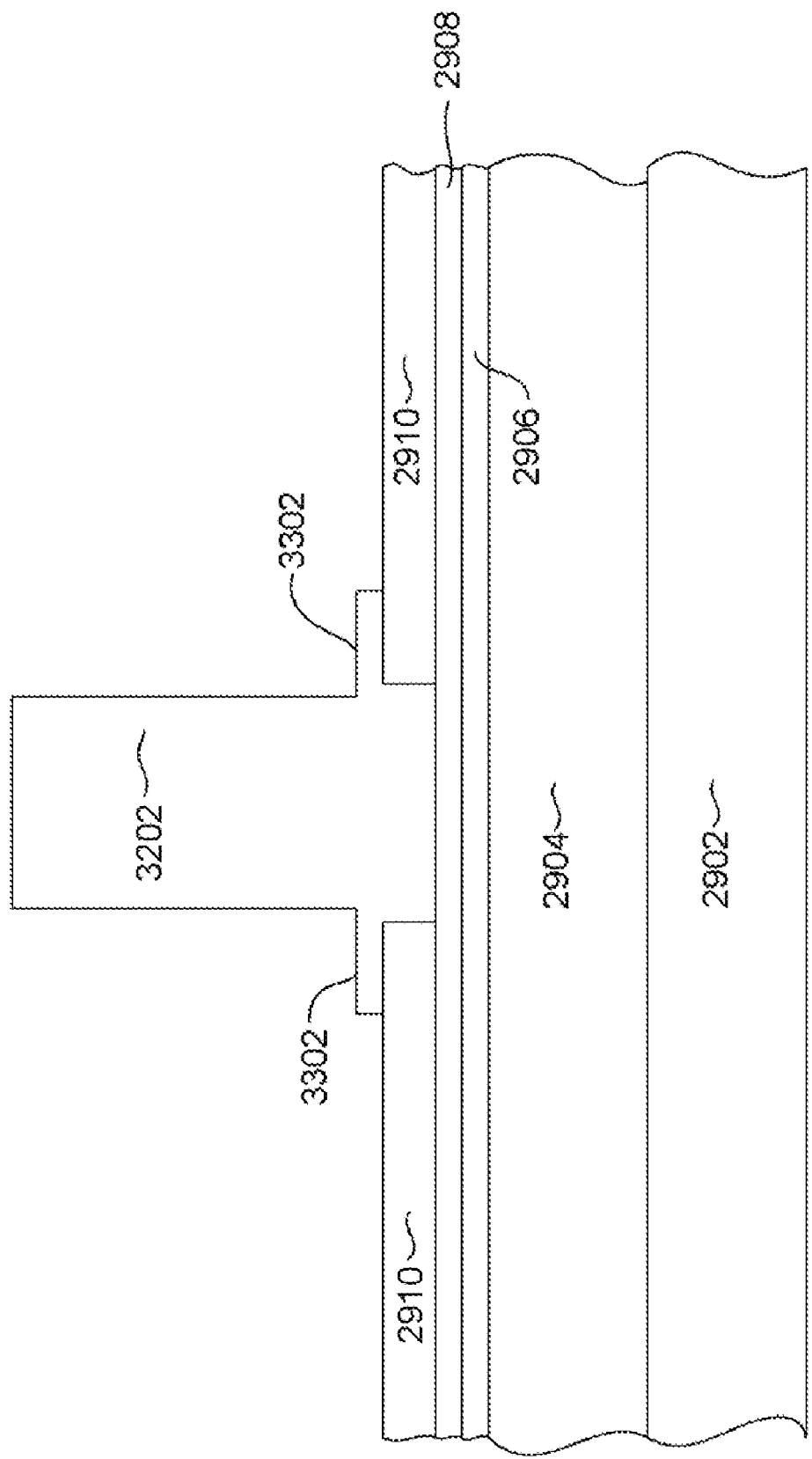

The deep UV photoresist 2914 and PMGI can be stripped off, such as by a chemical liftoff process, resulting in the structure shown in FIG. 33. As can be seen, the magnetic material that was deposited in to the undercuts 3004 (FIG. 32) forms laterally extending P2 wings 3302 near the bottom of the P2 pole structure formed by the magnetic material 3202. These wings may extend 0.1 to 0.2 um or some dimension greater than 0.1 um from the sides of the P2 pole structure 3202.

Figure 34:
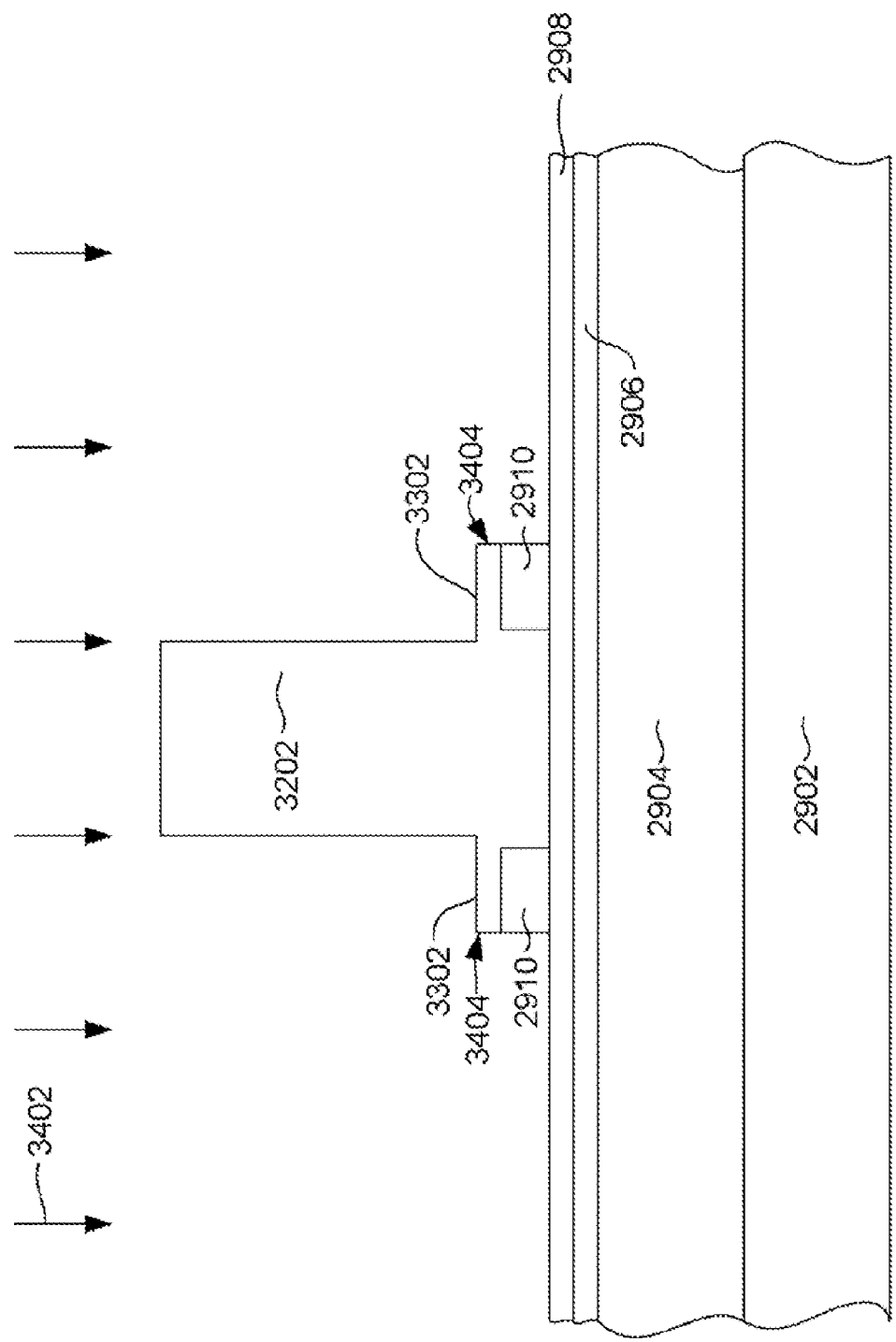

With reference to FIG. 34, a reactive ion etch (RIE) 3402 is performed. P2 wings 3302 form a RIE hard mask that protects portions of the RIEable film 2910 from removal during the RIE 3402. The structure resulting from the P2 wings 3302 and remaining RIEable layer 2910 results in steep shoulder pedestal structure having ion mill resistant wings 3404 having a thickness (measured vertically in FIG. 34) preferably greater than 0.1 um.

Figure 35:
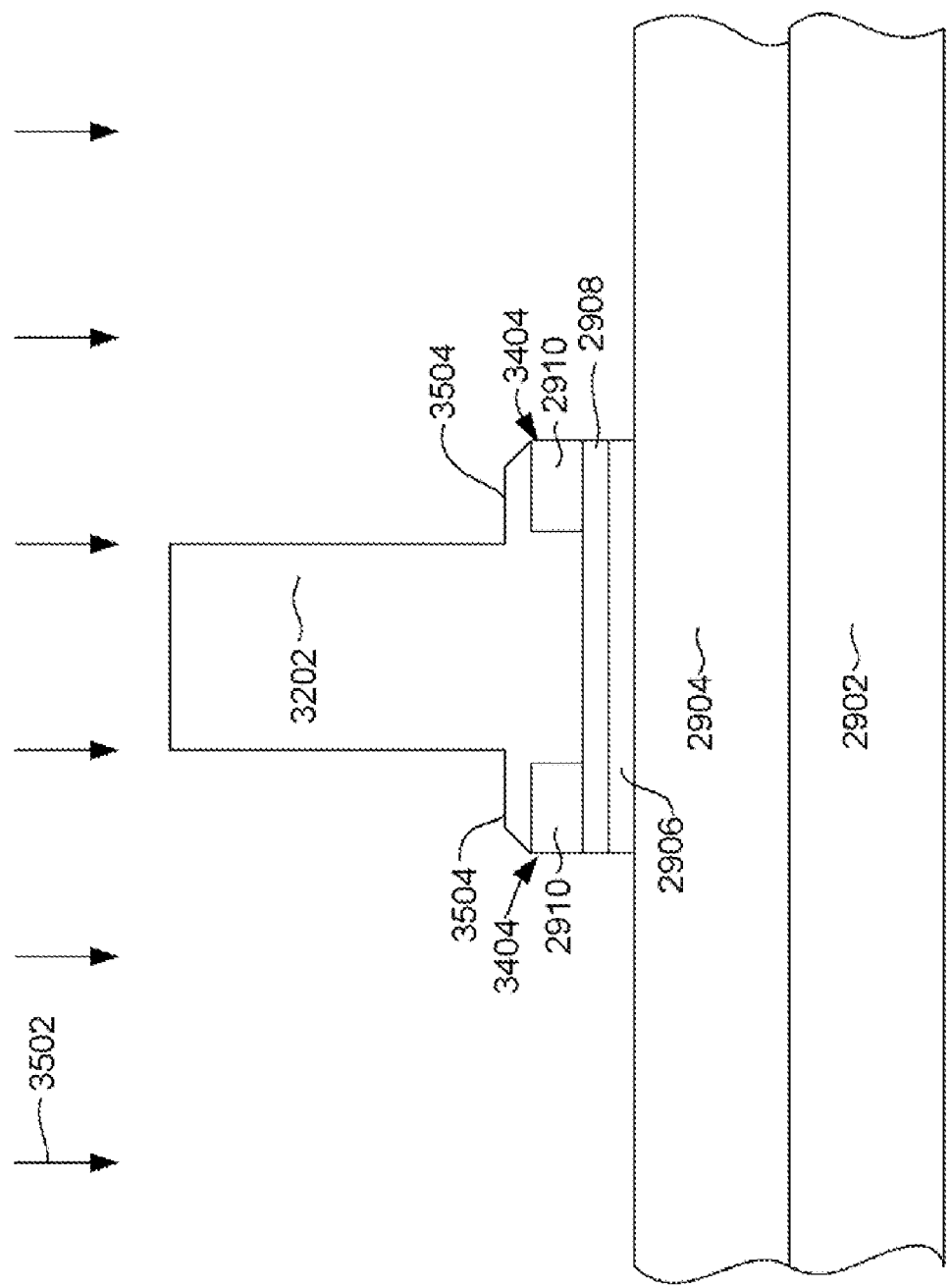
Figure 36:
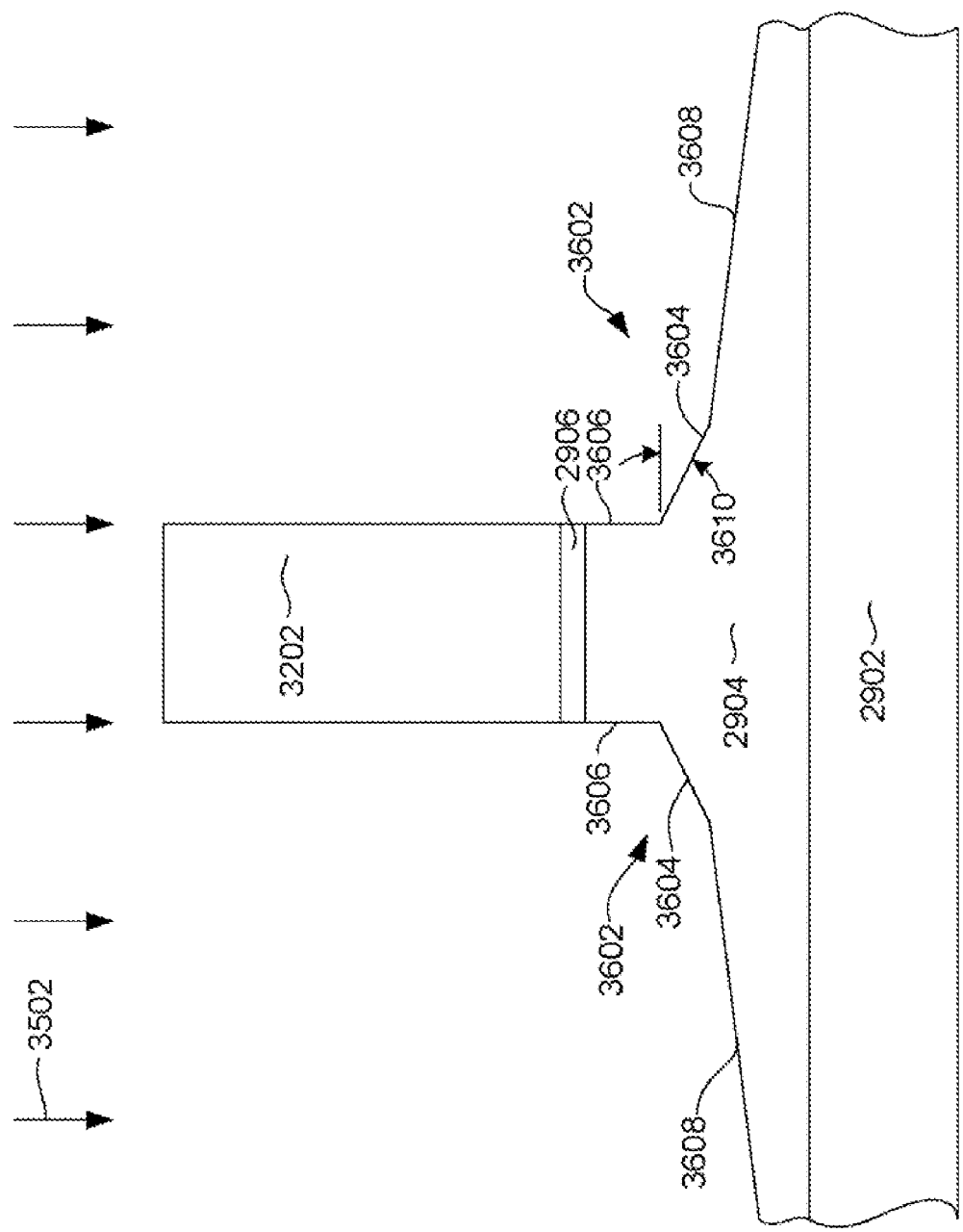

With reference now to FIG. 35, an ion mill 3502 is performed, sufficiently to remove the P2 seed layer, and the gap layer. As can be seen, the write gap layer and the bottom of the P2 pole 3202 extend laterally outward to form wings or steps 3504. Then, with reference to FIG. 36, the ion mill 3502 continues to remove underlying P1 first pole material 2904. The ion mill 3502 may include a combination of milling straight down to remove P1 material 2904 and milling at an angle to prevent the accumulation of redeposited material at the sides of the notched structure being formed in the P1 pole 2904.

As the ion milling 3502 proceeds to remove P1 material 2904, the step structure 3504 (FIG. 35) is gradually consumed. This results in a P1 structure that has a notch 3602 formed with a steep shoulder 3604, and which may also include a vertical notch portion 3606. The steep shoulder may taper off slightly to a more gradual slope at locations 3608 further laterally outward. The steep shoulder preferably defines an angle 3610 of 30-60 degrees or about 45 degrees with respect to the planes defined by the deposited layer (horizontal in FIGS. 29-36). The vertical portion 3606 of the notch 3602 may extend to a depth D of about 0 to 10 nm. After forming the notched pole structure, a non-magnetic fill layer such as alumina (not shown) can be deposited to encapsulate the pole.

Figure 37:
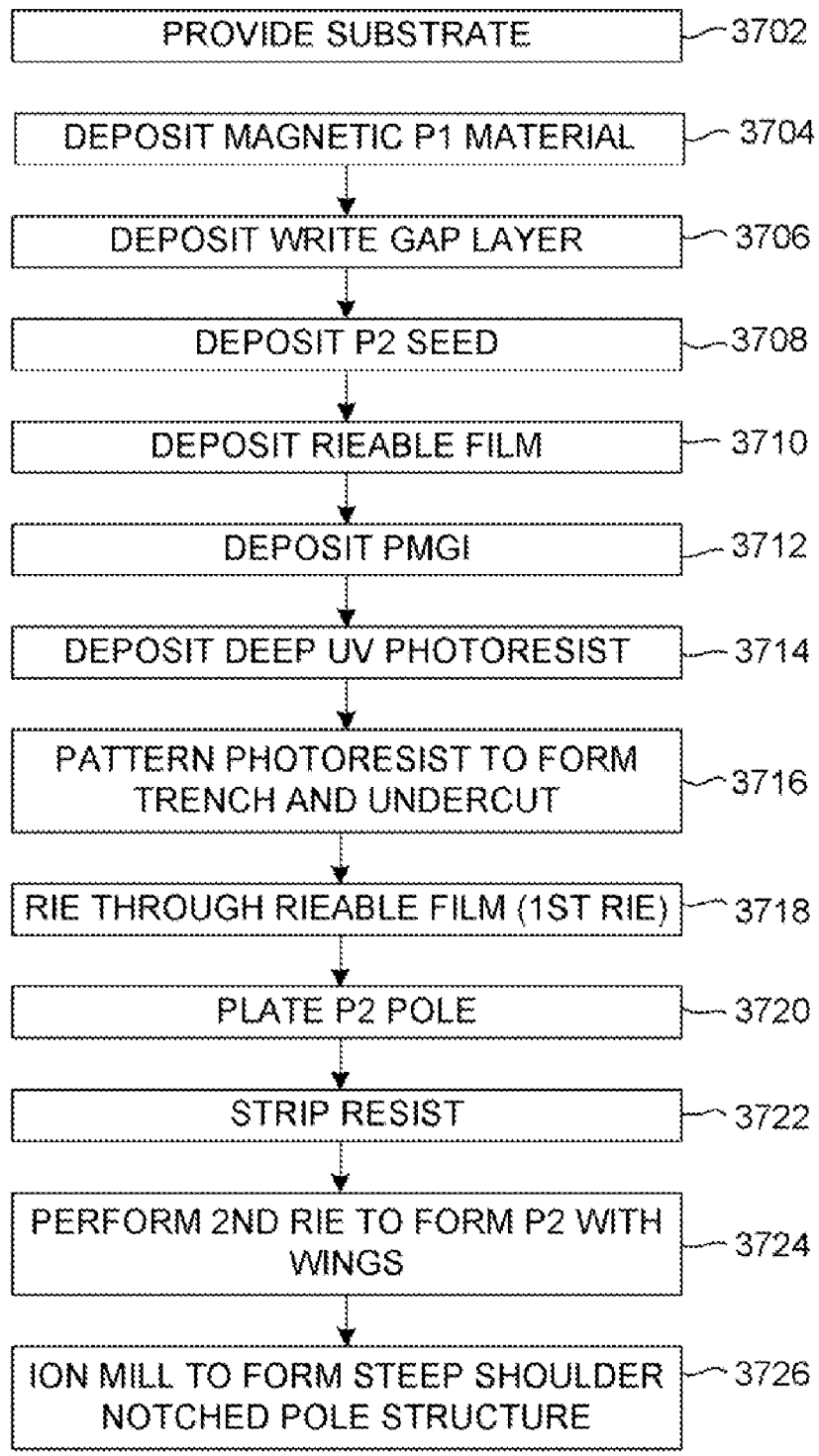
FIG. 37 is a flowchart illustrating a method of manufacturing a write head according to an embodiment of the invention.

With reference now to FIG. 37, the method for constructing a steep shouldered notched pole structure as described in FIGS. 29-36 can be summarized as follows. In a step 3702 a substrate is provided. The substrate can be, for example a planarized alumina underlayer. Then, in a step 3704, a layer of magnetic first pole (P1) material is deposited. This material can be for example NiFe, CoFe or some other suitable material. In a step, 3706 a layer of write gap material, such as alumina, is deposited. Then, in a step 3708 a magnetic P2 seed layer is deposited. In a step 3710 a RIEable film is deposited. The RIEable film can be, for example, $SiO_2$, SiN, Si, Ta, $Ta_2O_5$, DLC Tungsten, DURIMIDE®, etc. Then, in a step 3712 a PMGI layer (Polymethylglutarimide) is deposited.

In a step 3714 a thick layer of deep ultraviolet (deep UV) photoresist is deposited (spun on). In a step 3716 the deep UV photoresist is photolithographically patterned and developed to form a trench in the photoresist layer and an undercut in the PMGI layer. Then, in a step 3718 a $1^{st}$ reactive ion etch (RIE) is performed. This $1^{st}$ RIE removes the RIEable layer within the trench to expose the P2 seed layer. In a step 3720 a magnetic material such as NiFe, CoFe or some other suitable material is electroplated into the trench and undercut to provide a P2 structure.

In a step 3722, the deep UV photoresist is stripped, such as by a chemical liftoff process. Then, in a step 3724, a second reactive ion etch ($2^{nd}$ RIE) is performed to form a P2 structure with wing structures at the bottom. In a step 3726, an ion mill is performed to remove P2 seed material, write gap material and P1 magnetic pole material to form a notched P1 pole structure. The presence of the wings on the P2 structure causes the ion mill to form a desired steep shouldered notch structure on the P1 pole notch.

Figure 38:
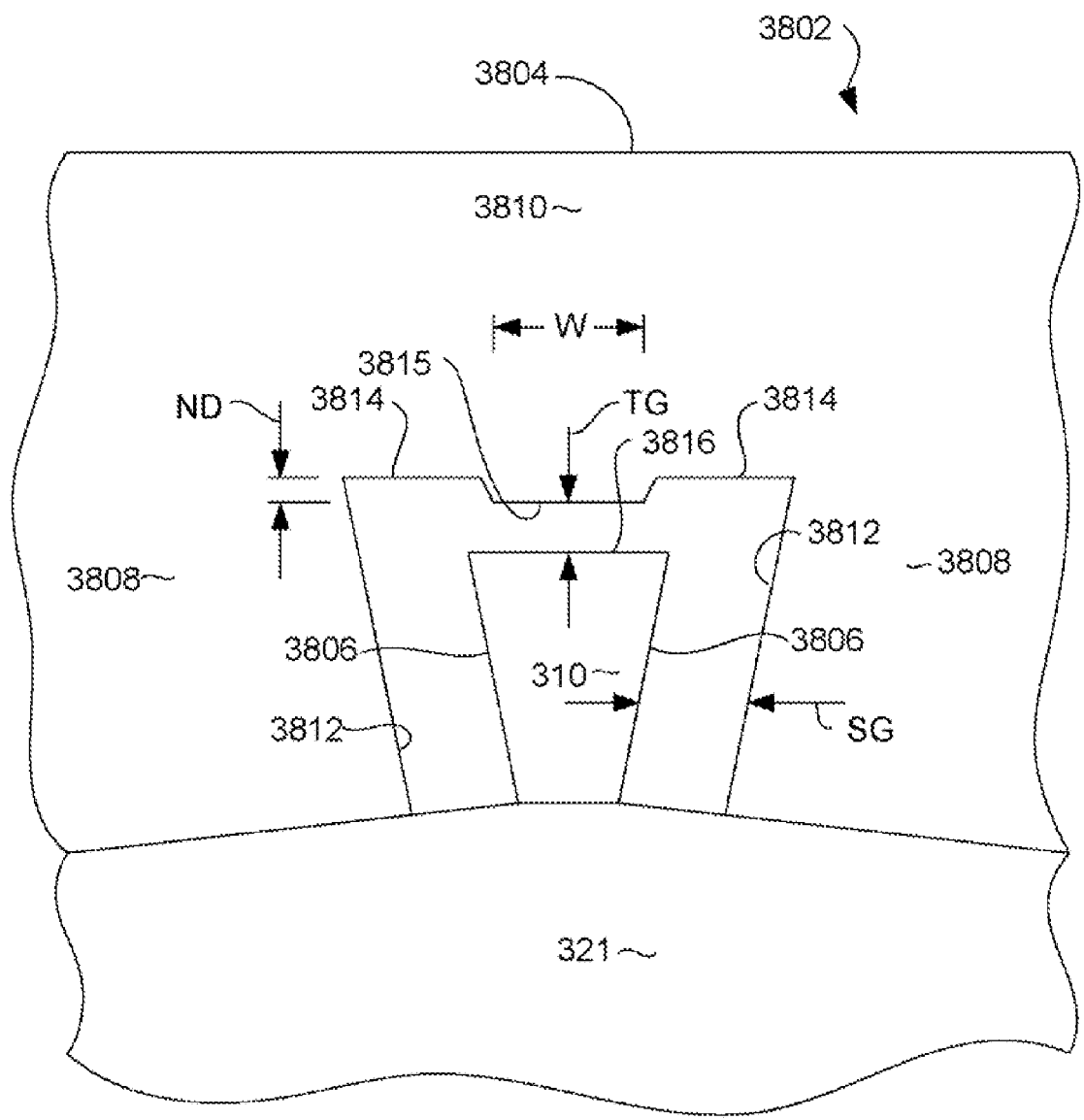
FIG. 38 is an ABS view of a portion of a write head design having conform wrap-around, trailing magnetic shield that minimizes adjacent track interference.

Conformal Side Shield:

With reference now to FIG. 38, a write head 3802 is described that has a trailing, wrap-around, magnetic shield 3804 that is configured to provide optimal protection from adjacent track interference and to improve write field and transition curvature. The write head 3802 includes a magnetic write pole 310 having a tapered trapezoidal shape as described earlier.

Therefore, the write pole has first and second laterally opposed sides 3806. The trailing, wrap-around shield 3804 is configured with side shield portions 3808 and with a trailing portion 3810. The side shield portions 3808 have inner sides or edges 3812 that face the sides 3806 of the write pole 310, and which are separated from the sides 3806 of the write pole by a non-magnetic side gap SG that is substantially constant. In other words, each of the sides 3812 of the side portion 3808 of the shield 3804 is substantially parallel with the adjacent side 3806 of the write pole 310.

It has been found that magnetic field spread can be greatly reduced if the sides 3812 of the shield 3810 are substantially parallel with the sides 3806 of the write pole, that is, if the sides of the shield 3810 are conformal with the write pole 3810. This conformity of the shield sides 3812 with the pole sides 3806 is especially beneficial in reducing adjacent track interference when the head 3802 is at a large skew angle (i.e. when the slider is at extreme inner or outer portions of the disk (not shown in FIG. 38)).

In addition, as can be seen with reference to FIG. 38, it can be seen that the shield 3804 is configured with notches 3814, also referred to as "rabbit ears". The performance benefits of such notches have been discussed above. Forming the trailing shield with notches 3814 improves magnetic performance by improving the strength of the write field and by improving transition curvature. Furthermore, the performance benefits are maximized when such notches 3814 are configured with a specific notch depth ND.

With reference still to FIG. 38, it can be seen that the trailing portion 3810 of the shield 3804 has a leading edge 3815 that is immediately adjacent to the trailing edge 3816 of the write pole 310. This shield edge 3815 is separated from the trailing edge 3816 of the write pole 310 by a non-magnetic Trailing Gap TG. This trailing gap TG has been discussed above with regard to previously described embodiments. This straight or trailing portion 3815 preferably extends beyond the sides of the pole 310, and preferably the width of the straight, trailing portion of 3815 is ½ to 1 times of the main pole width 310.

The notches 3814 each have a Notch Depth (ND), which is measured as the amount by which the notches extend past the leading edge 3815 in the trailing direction as indicated by the distance ND in FIG. 38. As mentioned above, the notches 3814 serve to improve write field and transition curvature. Furthermore, it has been found that the write field and transition curvature properties are optimized when the Notch Depth ND is about ¼ to 1 times the trailing gap distance TG.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for perpendicular magnetic recording, comprising:
    a substrate;
    a magnetic write pole formed on the substrate, the magnetic write pole having first and second laterally opposed sides, and having a trailing edge extending from the first side to the second side; and
    a magnetic shield having a trailing portion with a leading edge adjacent to the trailing edge of the write pole and separated from the trailing edge of the write pole by a non-magnetic trailing gap, and having first and second side portions that are each separated from an adjacent one of the first and second sides of the write pole by first and second non-magnetic side gaps; wherein
    each of the side portions of the magnetic shield has an inner edge that is substantially parallel with the adjacent side of the write pole; and wherein
    each of the side gaps has a thickness that is 1.5 to 2.5 times the thickness of the trailing gap.

2. A magnetic write head as in claim 1 wherein each of the side gaps comprises alumina.

3. A magnetic write head as in claim 1 wherein the write pole has a trapezoidal shape.

4. A magnetic write head as in claim 1 wherein the write pole has a leading edge, and wherein the first and second side portions of the shield extend in a leading direction at least as far as the leading edge of the write pole.

5. A magnetic write head as in claim 1 wherein each of the side gaps comprises a first layer of alumina and a second layer of alumina, and wherein the trailing gap comprises the second layer of alumina.

6. A magnetic write head as in claim 1 wherein each of the side gaps comprises a first non-magnetic layer comprising alumina and a second non-magnetic layer comprising a material other than alumina and wherein the trailing gap comprises the second non-magnetic layer.

7. A magnetic write head as in claim 1 wherein each of the side gaps comprises a first non-magnetic layer comprising alumina and a second non-magnetic layer comprising a material other than alumina and wherein the trailing gap comprises the second non-magnetic layer.

8. A magnetic write head as in claim 1 wherein each of the side gaps comprises a first layer of alumina and a second layer of alumina, and wherein the trailing gap comprises the second layer of alumina.

9. A magnetic write head as in claim 1 wherein each of the side gaps comprises a first non-magnetic layer comprising alumina and a second non-magnetic layer comprising a material other than alumina and wherein the trailing gap comprises the second non-magnetic layer.

10. A magnetic write head as in claim 1 wherein the straight write pole has a width and wherein the magnetic shield has a straight, trailing portion, adjacent to the trailing edge of the write pole that has a width that is ½ to 1 times the width of the trailing edge of the write pole.

11. A magnetic write head for perpendicular magnetic recording, comprising:
    a substrate;
    a magnetic write pole formed on the substrate, the magnetic write pole having first and second laterally opposed sides, and having a trailing edge extending from the first side to the second side; and
    a magnetic shield having a trailing portion with a leading edge adjacent to the trailing edge of the write pole and separated from the trailing edge by a non-magnetic trailing gap, and having first and second side portions that are each separated from an adjacent one of the first and second sides of the write pole by first and second non-magnetic side gaps; wherein:
    each of the side portions of the magnetic shield has an inner edge that is substantially parallel with an adjacent side of the write pole; and
    the shield is configured with first and second notches formed at first and second sides of the trailing portion of the shield, the notches extending further in a trailing direction than the leading edge of the trailing portion of the shield.

12. A magnetic write head as in claim 11 wherein each of the side gaps comprises alumina.

13. A magnetic write head as in claim 11 wherein the write pole has a trapezoidal shape.

14. A magnetic write head as in claim 11 wherein the write pole has a leading edge, and wherein the first and second side portions of the shield extend in a leading direction at least as far as the leading edge of the write pole.

15. A magnetic write head as in claim 11 wherein each of the side gaps has a thickness that is 1.5 to 2.5 times the thickness of the trailing gap.

16. A magnetic write head as in claim 11 wherein each of the side gaps comprises a first layer of alumina and a second layer of alumina, and wherein the trailing gap comprises the second layer of alumina.

17. A magnetic write head for perpendicular magnetic recording, comprising:
- a substrate;
- a magnetic write pole formed on the substrate, the magnetic write pole having first and second laterally opposed sides, and having a trailing edge extending from the first side to the second side; and
- a magnetic shield having a trailing portion with a leading edge adjacent to the trailing edge of the write pole and separated from the trailing edge by a non-magnetic trailing gap, and having first and second side portions that are each separated from an adjacent one of the first and second sides of the write pole by first and second non-magnetic side gaps; wherein:
- each of the side portions of the magnetic shield has an inner edge that is substantially parallel with an adjacent side of the write pole;
- the shield is configured with first and second notches formed at first and second sides of the trailing portion of the shield, the notches extending further in a trailing direction than the leading edge of the trailing portion of the shield; and
- the trailing gap has a thickness X and each of the notches extends beyond the leading edge of the trailing portion of the shield by a distance that is ¼ to 1 times X.

18. A magnetic write head as in claim 17 wherein each of the side gaps comprises alumina.

19. A magnetic write head as in claim 17 wherein the write pole has a trapezoidal shape.

20. A magnetic write head as in claim 17 wherein the write pole has a leading edge, and wherein the first and second side portions of the shield extend in a leading direction at least as far as the leading edge of the write pole.

21. A magnetic write head as in claim 17 wherein each of the side gaps has a thickness that is 1.5 to 2.5 times the thickness of the trailing gap.

* * * * *

UNITED STATES PATENT AND TRADEMARK OFFICE
CERTIFICATE OF CORRECTION

| | | |
|---|---|---|
| PATENT NO. | : 7,848,054 B2 | Page 1 of 1 |
| APPLICATION NO. | : 11/744054 | |
| DATED | : December 7, 2010 | |
| INVENTOR(S) | : Wen-Chien David Hsiao et al. | |

It is certified that error appears in the above-identified patent and that said Letters Patent is hereby corrected as shown below:

In the Specification:

Column 10, line 42 replace "achieve high level" with --achieve high bevel--;

Column 12, line 35 replace "write lead configured" with --write head configured--.

Signed and Sealed this
Fourteenth Day of July, 2015

Michelle K. Lee
*Director of the United States Patent and Trademark Office*